(12) United States Patent
Puentmann et al.

(10) Patent No.: US 12,495,986 B2
(45) Date of Patent: Dec. 16, 2025

(54) QUANTITATIVE IMAGING OF THE HEART MUSCLE

(71) Applicant: Johann Wolfgang Goethe-Universität Frankfurt am Main, Frankfurt am Main (DE)

(72) Inventors: Valentina Puentmann, Eschborn (DE); Eike Nagel, Eschborn (DE)

(73) Assignee: JOHANN WOLFGANG GOETHE UNIVERSITAT FRANKFURT AM MAIN, Frankfurt am Main (DE)

( * ) Notice: Subject to any disclaimer, the term of this patent is extended or adjusted under 35 U.S.C. 154(b) by 135 days.

(21) Appl. No.: 18/025,968

(22) PCT Filed: Sep. 14, 2021

(86) PCT No.: PCT/EP2021/075218
§ 371 (c)(1),
(2) Date: Mar. 13, 2023

(87) PCT Pub. No.: WO2022/053710
PCT Pub. Date: Mar. 17, 2022

(65) Prior Publication Data
US 2023/0346241 A1  Nov. 2, 2023

(30) Foreign Application Priority Data
Sep. 14, 2020  (EP) .................................... 20196010

(51) Int. Cl.
*A61B 5/05* (2021.01)
*A61B 5/055* (2006.01)
*G16H 30/40* (2018.01)
*G16H 50/30* (2018.01)

(52) U.S. Cl.
CPC ............. *A61B 5/055* (2013.01); *G16H 30/40* (2018.01); *G16H 50/30* (2018.01)

(58) Field of Classification Search
CPC ............ A61B 5/055; G16J 50/30; G16J 30/40
See application file for complete search history.

(56) References Cited

U.S. PATENT DOCUMENTS

| | | | |
|---|---|---|---|
| 2016/0109539 A1* | 4/2016 | Mardor | A61B 5/055 600/420 |
| 2016/0270687 A1 | 9/2016 | Brady-Kalnay et al. | |
| 2018/0038922 A1 | 2/2018 | Lu et al. | |
| 2018/0306882 A1 | 10/2018 | Li et al. | |

OTHER PUBLICATIONS

Search Report and Written Opinion for International Patent Application PCT/EP2021/075218, mailed on Dec. 23, 2021, 13 pages.

\* cited by examiner

*Primary Examiner* — Joel F Brutus
(74) *Attorney, Agent, or Firm* — MARSHALL, GERSTEIN & BORUN LLP

(57) ABSTRACT

The present invention provides a method for non-invasive quantitative imaging of a heart, the method comprising: obtaining an initial T1 map and a T2 map of the heart, and correcting the initial T1 map using the T2 map in order to obtain a corrected T1 map, wherein the correcting the initial T1 map comprises subtracting from a value in the initial T1 map a weighted value of the T2 map and adding a constant. The present invention also provides further methods and devices for non-invasive quantitative imaging of the heart.

12 Claims, 17 Drawing Sheets

Standard documentation

Suggested coordinate system 6 segments, 2-4 layers
3 slices plus apex
No temporal information 1 spoke every degree
360 spokes
100 layers
100 slices
100 temporal positions

QUANTITATIVE IMAGING OF THE HEART MUSCLE

TECHNICAL FIELD

The present invention relates to a method for non-invasive quantitative imaging of the heart muscle and a method for visualizing a T1 map and a T2 map. The present invention also relates to a device for non-invasive imaging of the heart muscle and to a method and a device for annotating medical data of a heart muscle. Furthermore, the method relates to a method and a device for predicting a risk of a cardiac event in a patient with myocardial inflammation.

The present invention also relates to a computer-readable storage medium storing program code, the program code comprising instructions for carrying out such a method.

BACKGROUND

Heart failure is increasingly prevalent due to aging population and unsolved treatment of its predisposing conditions, resulting in considerable morbidity and mortality and societal burden. In current clinical practice, the diagnostic and treatment steps are triggered by the onset of symptoms heart failure. The available treatment options for heart failure are applied to reduce the symptoms and prevent progression of disease. In most patients the timepoint of clinical diagnosis coincides with the advanced stages of structural heart disease and considerable structural heart impairment. The underlying tissue characteristics are not used to guide the individual therapy or monitor response to and success of treatment. The pathophysiological processes that lead to the eventual myocardial impairment include recurrent cycles of injury followed by adaptation and repair, i.e. myocardial inflammation and fibrosis, respectively. These processes typically precede the development of phenotypical and clinical overt heart disease for months-decades. They also represent uniform responses to a variety of toxic triggers, irrespective of the underlying condition (e.g. non-ischaemic: cardiotoxicity, autoimmune, in-herited; or ischaemic by coronary vessel occlusion related).

The pathophysiological processes and molecular mechanisms that underlie the development of heart disease, also referred to as the myocardial remodelling, which determine its progression into clinically symptomatic heart failure are better understood. In brief, these include a myriad of inflammatory cellular and interstitial changes, including necrosis and apoptosis of cardiomyocytes, inflammatory cell infiltration, myofibroblast activation, and extracellular matrix remodelling. Myocardial infiltration of lymphocytes and mononuclear cells, increased ex-pression of pro-inflammatory chemokines and cytokines and the contribution of autoimmune inflammation fuel the myocardial remodelling. Inflammatory processes of myocardial remodelling are increasingly related to non-infarcted myocardium in ischaemic heart disease. These molecular histopathological insights have been derived through studies primarily in animal disease models, which have been partially validated in human myocardial biopsies and autop-sies.

To date, there is no easily applicable diagnostic test allowing direct detection and real-time monitoring of these processes in every day clinical practice. Recognition of cardiac impairment relies on abnormal myocardial structure (increased dimensions of LV chambers, increased wall thickness) and impaired pumping function (reduced systolic function or ejection fraction) or reduced filling velocity by echocardiography. Often the symptoms are present with no structural impairment and with preserved or only mildly impaired function (heart failure with preserved or mildly reduced function). Whereas significant improvement of function can be measured in those presenting with severe impairment, the smaller changes, either way, are often impossible to track. In a small proportion of patients with heart failure functional improvement is observed, indirectly speaking for an element of reversibility of myocardial remodelling. If detected early and more directly, it could inform the specific treatment, monitor the effect of therapy and individualize medical care. Myocardial biopsy is an invasive approach to histological examination of the heart muscle: because it is performed using an invasive cardiac cathe-terization, reliant on an experienced operator, it will be only used in selected cases. Procedural complications are particularly high in severely ill patients. Furthermore, the interpretation relies on an experienced and highly qualified histopathological reference laboratory. The yield of myocardial immunohistopathology examinations is excellent for recognition of acute inflammatory processes and some infiltrative diseases, whereas the processes related to myocardial remodelling cannot be readily distinguished from those involved in chronic low-grade inflammation. The practical issues and limited diagnostic yield limit the clinical value of invasive myocardial histopathology, precluding the widespread use as well as serial applications in patients with heart failure. Magnetic resonance imaging (MRI) provides a non-invasive approach to evaluate tissue characteristics using a strong magnetic field and by its manipulation using magnetic gradient and radio waves to generate images. Within the scope of competent and safe MR conduct, there are no known pathological consequences of a single or repeated exposure. Myocardial magnetic relaxation mapping techniques measure the rate of magnetic field recovery into its original position, after its displacement using a magnetic field preparation prepulse. Two major mapping approaches relate to longitudinal and transverse vector components of the relaxation of magnetic field, also referred to as the T1 and T2 mapping. The rate of recovery relates directly to the underlying tissue composition and its extent allowing quantifiable tissue characterisation of the myocardium:

1. Diagnosis of abnormal myocardium: Differentiation the normal tissue from abnormal based on different ranges of values (normal reference range vs. abnormal (distance of ≥2 standard deviations, SD, above the mean of the normal range).
2. Differentiation between different types of conditions based on different underlying pathological ITEs, which have different rates of magnetic relaxation allowing non-invasive differentiation of different tissues (different values for water, lipid, iron, fibrosis, scar).
3. Prognosis: based on recognition of disease activity, stage of disease and association with cardiovascular outcome.

Thus, there is a need for tools that assist the physician with diagnosis and/or treatment of patients.

SUMMARY OF THE INVENTION

An objective of the present invention is to provide a method for non-invasive quantitative imaging of a heart and a method for visualizing quantitative imaging of the heart, which overcome one or more of the above-mentioned problems of the prior art.

A first aspect of the invention provides a method for non-invasive quantitative imaging of a heart, the method comprising:

obtaining an initial T1 map and a T2 map of the heart, and correcting the initial T1 map using the T2 map in order to obtain a corrected T1 map, wherein the correcting the initial T1 map comprises subtracting from a value in the initial T1 map a weighted value of the T2 map and adding a constant.

T1 map herein can refer to an image with T1 values, e.g. a 2D image or a 3D image volume, or it may refer to a collection of one or more T1 values. Preferably, the one or more T1 values are stored together with corresponding spatial coordinates. Correspondingly for the T2 map.

T1 map may refer to the result of a T1 mapping acquisition. Correspondingly for the T2 map.

Obtaining an initial T1 map and a T2 map of the heart may refer to obtaining an initial T1 mapping acquisition and a T2 mapping acquisition of the heart.

Correcting the initial T1 map may refer to correcting the initial T1 mapping values and using the T2 map may refer to using the T2 mapping values.

Obtaining a T1 map herein may refer to acquiring the T1 map, e.g. using an MR imaging device, or receiving the T1 map from another device, e.g. from a network device where the T1 map is stored. In the same way, the T2 map may be received from another device, e.g. from a network device.

The method of the first aspect allows obtaining a corrected T1 map that, compared to the initial T1 map, provides an improved diagnostic value. As outlined above, obtaining the corrected T1 map may refer to obtaining one or more corrected T1 values.

In a first implementation of the method according to the first aspect, a weight of the weighted value is between 10 and 15, preferably between 11 and 14, in particular between 12 and 13, and the constant is between 350 and 500, preferably between 400 and 450.

In a further implementation of the method according to the first aspect, the method further comprises:

using a 2D colour map to map a value from the corrected T1 map and a value from a corresponding position in the T2 map to an output colour, wherein in the 2D colour map, a lowest value in a first direction corresponds to a first colour, a highest value in the first direction corresponds to a second colour, a lowest value in a second direction corresponds to a third colour and a highest value in the second direction corresponds to a fourth colour, wherein the first to fourth colour are different colours, and outputting the output colour on a screen.

The 2D colour map herein may refer to a mapping that maps two input values to an output colour.

It is understood that in this implementation values that fall between the lowest and the highest value in the first direction and/or between the lowest and the highest value in the second direction are assigned colours with corresponding interpolated colour values.

Experiments have shown that this kind of colour visualization allows for more efficient and more accurate diagnosis.

In a further implementation of the method according to the first aspect, the first colour is black, the second colour is yellow, the third colour is blue and the fourth colour is red.

Experiments have shown that this colour combination is particularly useful for the physician to quickly capture the information content of the colourized image.

In a further implementation of the method according to the first aspect, the initial T1 map and the T2 map comprise a region of the heart, and the method further comprises predicting a risk of a cardiac event for a patient with myocarditis, wherein the predicting comprises:

obtaining a T1 value based on the region of the heart in the corrected T1 map and obtaining a T2 value based on the region of the heart of the patient in the T2 map, wherein in particular the region is a single mid-ventricular short-axis slice, and computing the risk based on a weighted sum of the T1 value, the T2 value and one or more additional coefficients.

Computing the risk of the cardiac event based on the weighted sum of that T1 value, the T2 value and one or more additional coefficients has experiments be shown to give a more accurate prediction compared to calculate taking the risk based only on unweighted T1 and T2 values.

In embodiments, the method does not directly predict a risk of a cardiac event, but provides data that allow a physician to predict a risk of the cardiac event. In those embodiments, the computed risk is merely a score that allows the physician to predict a risk of a cardiac event (which may include that the physician includes other information that is not available to the presented In some embodiments, predicting a risk of a cardiac event for a patient with myocarditis includes myocarditis in the sense of chronic, subclinical inflammation. In other words, in these embodiments myocarditis is not limited to a severe acute disease (such as a dead football play-ers on the pitch, or ICU admission) or something mild which heals with no problems. Instead, it may also include 'chronic inflammatory cardiac remodelling'.

In a further implementation of the method according to the first aspect, the method further comprises:

obtaining a radiologic imaging, in particular a magnetic resonance image, of the heart;

determining, based on the radiologic image, a longitudinal axis of the heart;

for at least one selected location in the image, determining at least one cardiologic coordinate, wherein the cardiologic coordinate comprises:

a longitudinal coordinate, which indicates a projection of the location onto the longitudinal axis, a circumferential coordinate, which indicates a circumferential position of the location around the longitudinal axis, and a radial coordinate, which indicates a radial distance of the location from the longitudinal axis; and using the cardiologic coordinate to annotate the at least one selected location.

It is understood here that obtaining a radiologic image may refer to acquiring the radiologic image using a medical imaging device. Radiologic image herein may refer in particular to an MR image.

This implementation allows the physician to annotate the radiologic image using the at least one cardiologic coordinate. The at least one cardiologic coordinate is designed such that corresponding positions in hearts of different patients are assigned same or similar coordinate values. This has the advantage that annotations from different physicians and different patients can be directly compared.

In a further implementation of the method according to the first aspect, the annotating the at least one selected location comprises:
  outputting the cardiological coordinate on a screen,
  storing the cardiological coordinate in a data storage, and/or
  visualizing on a screen one or more lines, overlaid over the radiologic image, wherein the one or more lines correspond to a constant longitudinal coordinate, a constant circumferential coordinate and/or a constant radial coordinate of the cardiological coordinate.

This implementation has the advantage that the cardiological coordinate is available for the physician.

A second aspect of the invention provides a device for non-invasive quantitative imaging of a heart wherein the device is configured to carry out the method of the first aspect or one of the implementations of the first aspect. The device of the second aspect can comprises a computer and/or a monitor. The device can be configured to be connected to an image acquisition device, in particular a magnetic resonance imaging device. The connection can be implemented e.g. through a computer network A third aspect of the present invention provides a method for visualizing a T1 map and a T2 map, the method comprising:
  using a 2D colour map to map a value from the T1 map and a value from a corresponding position in the T2 map to an output colour, wherein in the 2D colour map, a lowest values in a first direction corresponds to a first colour, a highest value in the first direction corresponds to a second colour, a lowest value in a second direction corresponds to a third colour and a highest value in the second direction corresponds to a fourth colour, wherein the first to fourth colour are different colours, and
  outputting the output colour on a screen.

It is understood that for mapping to an output colour of a value between the lowest value in the first direction and the highest value in the first direction interpolation is performed. In other words, the four colours can correspond to extreme values in the colour map and positions in between are interpolated accordingly.

Experiments have shown that this visualization allows for particularly efficient and accurate diagnosis of the information from the T1 map and the T2 map.

In a first implementation of the method according to the third aspect, the T1 map is a corrected T1 map that has been corrected based on the T2 map, in particular using the method of the first aspect or one of the implementations of the first aspect. Experiments have shown that the visualization is particularly useful and accurate if it is based on the corrected T1 map.

Preferably, the first to fourth colour are chosen as colours that are easily distinguishable by a physician.

In a further implementation of the method according to the third aspect, the first colour is black, the second colour is yellow, the third colour is blue and the fourth colour is red.

A fourth aspect of the present invention provides a device for visualizing a T1 map and a T2 map, wherein the device is configured to carry out the method of the third aspect or one of the implementations of the third aspect.

A fifth aspect of the present invention provides a method for annotating medical data of a heart, the method comprising:
  obtaining a radiologic image, in particular a magnetic resonance image, of the heart;
  determining, based on the radiologic image, a longitudinal axis of the heart;
  for at least one selected location in the image, determining at least one cardiologic coordinate, wherein the cardiologic coordinate comprises:
    a longitudinal coordinate, which indicates a projection of the location onto the longitudinal axis,
    a circumferential coordinate, which indicates a circumferential position of the location around the longitudinal axis, and
    a radial coordinate, which indicates a radial distance of the location from the longitudinal axis; and
    using the cardiologic coordinate to annotate the at least one selected location.

This implementation allows the physician to annotate the radiologic image using the at least one cardiologic coordinate. The at least one cardiologic coordinate is designed such that corresponding positions in hearts of different patients are assigned same or similar coordinate values. This has the advantage that annotations from different physicians and different patients can be directly compared.

In a first implementation of the method of the fifth aspect, the annotating the at least one selected location comprises:
  outputting the cardiologic coordinate on a screen,
  storing the cardiologic coordinate in a data storage, and/or
  visualizing on a screen one or more lines, overlaid over the radiologic image, wherein the one or more lines correspond to a constant longitudinal coordinate, a constant circumferential coordinate and/or a constant radial coordinate of the cardiologic coordinate.

This visualization on the screen of the one or more lines, which correspond to constant coordinate values, has the advantage that the physician quickly and sees positions in the image that correspond to a same longitudinal coordinate, circumferential coordinate and/or radial coordinate.

There may also be other ways of how the cardiologic coordinate is stored, processed or visual-ized for the physician. For example, the cardiologic coordinate may be sent over a computer network to a further device in the computer network, such that the further device can perform processing based on the cardiologic coordinate. In other words, the determined cardiologic coordinates are not only for direct use by the physician, but can also be used for automated processing of the annotation.

In a preferred embodiment, patient images can be warped to a reference image, wherein the reference image corresponds to the standardized coordinates. In other words, pixel or voxel values from a patient image can be mapped such that equal distances in the warped image correspond to equal distances in the cardiologic coordinate system.

In a second implementation of the method of the fifth aspect, the method further comprises
  rounding the longitudinal position into one of a predetermined number of possible longitudinal positions, wherein preferably the predetermined number of possible longitudinal positions is between 50 and 200, preferably 100,
  rounding the circumferential coordinate into one of a predetermined number of possible circumferential positions, wherein preferably the number of possible circumferential positions is 360, and/or
  rounding the radial coordinate into one of a predetermined number of possible radial positions, wherein preferably the number of possible radial positions is between 50 and 200, preferably 100.

Experiments have shown that the surroundings lead to shorter and thus easier to process and memorize card logic coordinates.

In a third implementation of the method of the fifth aspect, the method further comprises rounding the longitudinal position, wherein preferably the initial rounding is used for a visualization, in particular an overlay of the radiologic image and an indication of the boundaries of the coarse rounding.

In a fourth implementation of the method of the fifth aspect, the cardiologic coordinate further comprises a temporal coordinate, wherein the temporal coordinate is determined based on a temporal distance to a predefined point of the cardiac cycle.

In a further implementation of the method according to the fifth aspect, the predefined point is defined relative to the P spike of the heart, preferably the beginning of the P spike. Determining the temporal coordinate relative to the P spike of the heart has the advantage that the temporal coordinate is relative to a reproducibly and accurately determinable position in the cardiac cycle.

According to a sixth aspect, an embodiment of the present invention provides a device for non-invasive quantitative imaging of a heart, where the device is configured to carry out the method of the fifth aspect or one of the implementations of the fifth aspect.

A seventh aspect of the present invention provides a method for predicting a risk of a cardiac event for a patient with myocarditis, the method comprising:
  obtaining a T1 value and a T2 value of a region of the heart of the patient, in particular a single mid-ventricular short-axis slice, and
  computing the risk based on a weighted sum of the T1 and T2 values and one or more additional coefficients.

In a first implementation of the method according to the seventh aspect, the T1 value of the region is an average of values of the T1 map in the region and/or when the T2 value of the region is an average of values of the T2 map in the region.

In a second implementation of the method according to the seventh aspect, the additional coefficients include one or more of age, gender, haematocrit, hs-CRP, hsTropT, LV-EF, RVEF and myocardial LGE.

In a third implementation of the method according to the seventh aspect, the coefficients are determined using multivariable Cox regression.

A further aspect of the invention refers to a computer-readable storage medium storing program code, the program code comprising instructions that when executed by a processor carry out the method of the first, third, fourth, fifth, sixth and seventh aspect or one of the implementations of the first, third, fourth, fifth, sixth and seventh aspect.

BRIEF DESCRIPTION OF THE DRAWINGS

To illustrate the technical features of embodiments of the present invention more clearly, the accompanying drawings provided for describing the embodiments are introduced briefly in the following. The accompanying drawings in the following description are merely some embodiments of the present invention, modifications on these embodiments are possible without departing from the scope of the present invention as defined in the claims.

DETAILED DESCRIPTION OF EMBODIMENTS

Figure 1:
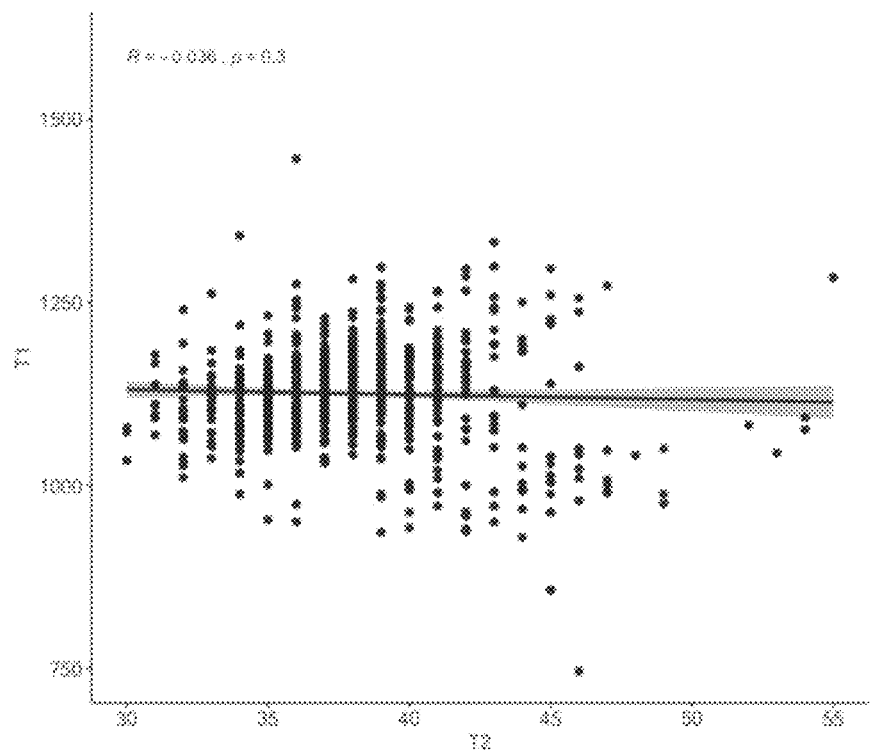
FIG. 1 shows a plot of T1 values vs. T2 values for MR images of patients with various cardiac diseases but no suspected inflammation. There is no systematic effect of T2 on T1.

Some presented embodiments relate to the ability of native myocardial T1 and T2 mapping (with no contrast agent administration within a minimum of 1 week) and post-contrast T1 mapping (within 20 minutes after administration of gadolinium based contrast agent, either by measuring postcontrast T1 or extracellular volume fraction, ECV) in detection of myocardial pathological remodelling processes that lead to development of heart failure symptoms. Numerous studies correlated myocardial mapping measurements of longitudinal relaxation in myocardium to histologically determined fibrosis infiltration (amyloidosis), oedema by histological desiccation, myocardial iron content, and validated these findings in the model diseases (inflammatory, hereditary, infiltrative, valvular and ischaemic heart disease).

T1 and T2 mapping indices increase in the presence of myocardial disease compared to controls. T1 mapping indices have been shown to relate to prognosis in patients with non-ischaemic cardiomyopathy, ischaemic heart disease and light-chain amyloidosis. Notably, these are data were obtained in model diseases in order to provide a proof of concept for mapping measurements to show the difference between health and overt disease. However, no study to date has published the use of these tools in unselected populations as a screening tool to detect abnormal myocardium as a pre-stage of myocardial remodelling and heart failure.

Experiments have shown that by establishing a sequence-specific normal ranges (mean±2 standard deviation (SD)) in subjects with no known or established cardiac disease, not taking any medications and normal blood tests, including cardiac makers, we can separate between pathological remodelling and healthy myocardium, as well as stratify patients in terms of prognosis. In the largely unpublished data, it is further demonstrated that in the disease subcategories, T1 and T2 mapping indices directly relate to the amount of myocardial injury (by high-sensitive-troponin T), increased wall stress (by NT-proBNP), inflammatory processes, as well as prognosis. Furthermore, it is demonstrated that the combinational readouts of T1 and T2 values allow deciphering the underlying tissue substrates and allow differentiation disease stages and condition subcategories. Lastly, our data reveal that guiding disease based on T1 and T2 mapping readouts provides more sensitive measure of myocardial recovery, compared to symptoms alone. The personalised insights based on the underlying histopathology and the prognostic risk provide an informed approach to treatment of predisposing conditions for heart failure.

Thus, the present ideas aim to provide means and methods system and method for application of non-invasive histopathophysiology of the heart muscle using cardiovascular magnetic resonance for diagnosis, prognosis and guiding of therapy in predisposing conditions that lead to heart failure. It is a further objective to provide means and methods for risk stratification of patients in predisposing conditions that lead to heart failure. Also, it is an objective to support means and a method system to deliver personalised insights based on the underlying histopathology and the prognostic risk guide an informed approach to treatment of predisposing conditions for heart failure.

The objectives can be solved by using means and a system of non-invasive imaging using T1 and T2 mapping of the heart with MRI for diagnosis, prognosis and therapy of abnormal myocardial remodelling and heart failure.

A presented method comprises:
1. Acquisition using myocardial T1 and T2 mapping can be achieved for example with several technically different approaches, which have in common:
   a. The use of an imaging apparatus support cardiac magnetic resonance imaging which is approved for clinical use.
   b. The use of T1 and T2 mapping sequences, which are defined by ability to provide an appropriate preparation of magnetisation using inversion or saturation pre-pulses, or their combinations or modifications and acquisition of several images of heart muscle using any range of flip angles and any number of image-to-prepulse acquisition schemes.
   c. The use of any approach to generating an exponential fit-curve of signal intensities based on a series of images
   d. The read-out values for T1 and T2 mapping include time at 63% and 37% relaxation, respectively
   e. Determine the T1 value of myocardium from the one or more images
2. Acquisition of myocardial late gadolinium enhancement, post-contrast T1 mapping or equivalent imaging of regional replacement fibrosis.
3. Interpretation of values, which are sequence and conditions specific for the purpose of screening, diagnosis and prognosis, as well as guiding of therapy. The objectives are solved by providing a screening tool for the presence of abnormal myocardium as the pre-stage of myocardial remodelling leading to heart failure. The detection of abnormal tissue characteristics by cardiovascular magnetic resonance imaging represents a clinically abnormal result. The person is classified as 'a patient' when they have an abnormal native T1. This concept is quite new, as it provides a new definition of abnormal.

In embodiments of the present invention, the term heart failure is used also for earlier signs/symptoms of heart failure—not only the late overt cases. This includes 'heart failure with preserved ejection fraction' and subnormal function of the heart. In particular, the term "heart failure" may include "heart failure with preserved ejection fraction (HFpEF)" and/or "heart failure with mildly reduced ejection fraction (HFmrEF)".

In embodiments, 'heart failure with preserved ejection fraction' may also include 'diastolic dysfunction'. An early sign of HFpEF is diastolic dysfunction measured by echocardiography as E/e'. CMR may be in particular suitable to diagnose HFpEF. The literature so far describes extracellular volume fraction (ECV), but not native T1 or T2. Experiments of the inventors show that a score developed from a combination of CMR parameters with a blood marker (BNP) correlates much stronger with invasively determined diastolic function than echocardiography.

The objectives are furthermore solved by providing sequence-specific normal reference ranges (mean of the normal range, SD of the normal range, obtained within a minimum of 200 healthy subjects, defined as no known medical history, cardiac or systemic disease, normal cardiac function and structure on CMR, no LGE, normal routine blood tests, as well as cardiac serology and no regular medication). The features of normal distribution are applied to separate the normal from abnormal myocardium based on the distances 2SD (or Z-score).

The objectives are furthermore solved by providing the risk stratification schemes, which pro-portionally relate to the severity of disease and worse prognosis. Because of the linearity of the relationship between the severity of myocardial disease and quantitative tissue measures, SD of normal ranges (or z-scores, quartiles, tertiles, or similar statistical approaches) can be applied to estimate predictive association with outcome to derive risk scores.

The objectives are furthermore solved by providing a diagnostic algorithm, which is sequence and cardiac condition specific. This is based on the observation that firstly, different cardiac conditions display different diagnostic patterns of T1 and T2 mapping values, based on pre-dominant underlying ITE determinant. Secondly, different sequences have different ranges and limits of analytical detection. The representative tissue signatures and their interpretation is presented in the Table below:

| ITE | Interpretation | Tissue Signature | | Optional supporting imaging characteristic | | | Additional clinical markers Genotype |
| --- | --- | --- | --- | --- | --- | --- | --- |
| | | Native T1 | Native T2 | LGE | LV Volumes | LV EF | |
| Normal myocardium | Normal | Normal range | Normal range | none | Normal range | >55% | n/a |
| Abnormal myocardium | | ≥2 SD and ≤2 SD | ≥2 SD and ≤2 SD | | | | n/a |
| Hypertension | Normal | Normal range | Normal range | none | Normal range | >55% | n/a |
| Inflammation | High-grade | ≥2 SD | ≥2 SD | *NI-LGE | *dilated | *<50% | |
| | Low-grade | ≥2 SD | ≥2 SD | *NI-LGE | *dilated | *<50% | |
| | healed | normal | normal | *NI-LGE | *dilated | *<50% | |
| Cardiomyopathy | | ≥2 SD | normal | | | | |
| Non-ischaemic | Present | ≥2 SD | normal | *NI-LGE | *dilated | *<50% | |
| Hypertrophic | Present | ≥2 SD | normal | *NI-LGE | | | HCM-related genes |
| Uremic (eGFR < 60) | Present | ≥2 SD | ≥2 SD | *present | *dilated | *<50% | |
| Amyloidosis | | ≥2 SD | normal | *NI-LGE | *dilated | *<50% | ATTR Gene |
| Iron | | ≤2 SD | ≤2 SD | | *dilated | *<50% | Thalasaemia, Haemochromatosis |
| Lipid | | <2 SD | ≤2 SD | *present | | | Fabry-related genes |
| Chronic coronary artery disease | No remodelling | Normal range | Normal range | *Isch-LGE | *dilated | *<50% | |
| | Remodelling | ≥2 SD | normal | *Isch-LGE | *dilated | *<50% | |
| Acute Coronary Syndrome | | ≥5 SD | ≥2 SD | Isch-LGE | *dilated | *<50% | |

ITE—imaging tisme equivalent, body surface area-BSA, normal (range = Mean ± 2 SD, as above)

The objectives are furthermore solved by providing a risk stratification algorithm, which is sequence and cardiac-condition specific. A default risk-stratification based on ischaemic or non-ischaemic categorisation shall be used where no specific underlying condition can be determined by clinical means. Thirdly, different sequences show different prognostic associations in different cardiac conditions. This translates into risk stratification schemes based on the cut-offs, which are sequence-specific and cardiac-condition specific.

The objectives are furthermore solved by providing therapeutic guidance schemes, which are sequence- and cardiac-conditions specific. These are guided by firstly, the prevalent ITE determinant of the diagnostic pattern of T1 and T2 mapping values. Secondly, they are guided by a greater severity of disease, an estimated worse prognosis and evidence of reversibility. Thirdly, they are adapted by repeat measurements determining the effectiveness and continuous need of a given therapy.

T2 Correction of T1 Maps for Cardiac Imaging

As seen above T1 maps of the heart muscle are excellent parameters to detect abnormalities of the heart and predict prognosis. However, the more sensitive and reproducible they are, the more they are influenced by T2 effects. The invention allows correcting T1-maps for the T2-effect to obtain 3 separate numbers: T2-influenced T1, T2 and corrected T1.

Based on large scale T1 and T2 data as well as on data obtained before and after dialysis, we are able to model a T2-corrected T1 value using the specific imaging sequences employed and validated in our Institute. This novel parameter: T2corrected T1 adds to the armamentarium of myocardial mapping by keeping the advantages of a highly sensitive and robust T1-map which delivers T2-influenced T1 values while allowing to calculate true T1 and true T2.

T2 correction is a formula used during post-processing developed by us from a large database.

T2 corrected T1 values were similar before and after dialysis (which changes the amount of water in the myocardium and, thus alters T2 and T2-influenced T1, but not T2 corrected T1).

Until now, T1 mapping, T2-sensitivity of T1 mapping and T2 mapping have been described. T1 and T2 have been understood to be highly diagnostic and prognostic. Most researchers try to "optimise" T1 mapping to be less sensitive to T2, this, however, results in less robust data and a lower diagnostic accuracy.

A main advantage is T2-corrected T1 adds to the armamentarium of myocardial mapping by keeping the advantages of a highly sensitive and robust T1-map which delivers T2-influenced T1 values while allowing to calculate true T1 and true T2.

Further advantages of T2-corrected T1 (also referred to as T1C) can include:
  It keeps the excellent robustness and reproducibility seen with T2 sensitive MOLLI variants (most notably FFM-MOLLI 3(2)3(2)5 50° flip angle)
  It allows separation of the fibrosis and the water component in the T1 measurements It should provide prognostic value beyond uncorrected T1 especially in inflammatory diseases where a T2 sensitive T1 is dominated by the T2 effect (water)

It should remain unchanged when inflammation is treated.

We have used four different groups of patients:

A: Patients with various cardiac diseases but NO suspected inflammation
B: Patients with suspected myocardial inflammation
C: Patients with sarcoid disease before and after therapy
D: Patients with chronic kidney disease before and after dialysis.

In group A, we assessed the normal correlation of T1 and T2 with minimal T2 effect. As can be seen from FIG. 1, there is no systematic effect of T2 on T1.

Figure 2:
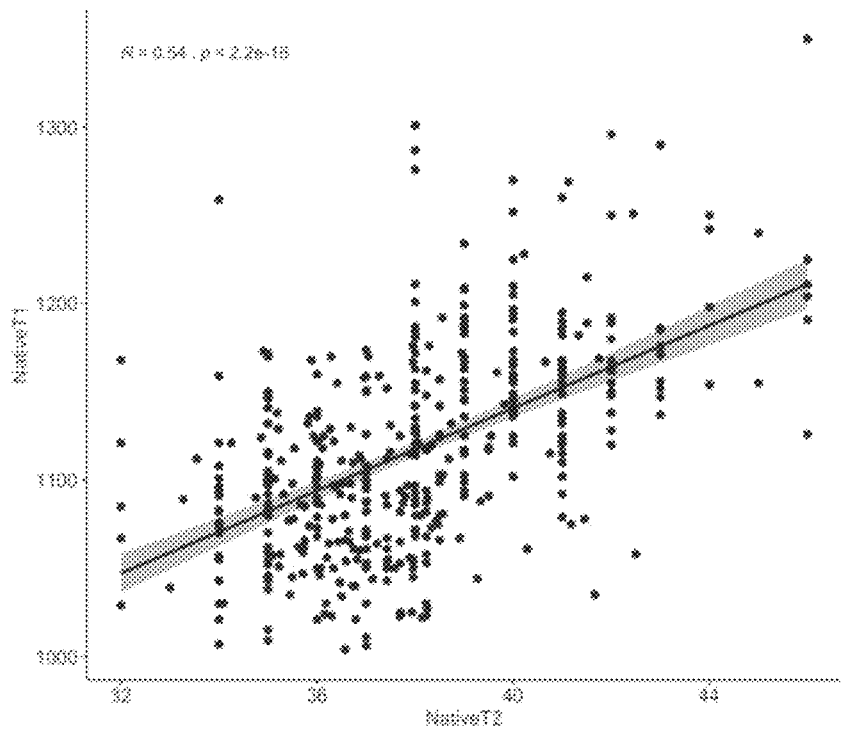
FIG. 2 shows a plot of native T1 values vs. native T2 values for patients with suspected myocardial inflammation. There is a significant effect of T2 on T1.

In group B we determined the correlation between T1 and T2 and developed a correction factor to achieve a similar relationship of T1C with T2 as observed between T1 and T2 in patients without inflammation. As is visible in FIG. 2, there is a clear dependency of native T1 on native T2 in patients with inflammation.

Experiments have shown that a correction can be obtained by using the preferred correction formula of the form $$T1c = T1 - a*T2 + b$$

with suitable constants.

Preferably, constant a is in the range of 10 to 15, in particular in a range between 11 and 14, for example in a range between 12 and 13.

Preferably, constant b is in a range between 300 and 500, in particular in a range between 375 and 450, for example, in a range between 410 and 440.

In a preferred embodiment, the following formula is used:

$$T1c = T1 - (T2-34)*12,5$$

Applying one of the above formulas leads to a corrected T1 map, referred to as T1C, wherein the corrected T1 map has values essentially without T2 influence.

T2 correction of native T1 works with all T2-sensitive MOLLI variants.

Validation has been performed specifically for a unique T1-mapping sequence developed from and used in our Institute (FFM-MOLLI 3(2)3(2)5)50° which offers the best diagnostic dis-crimination, superior reproducibility and strongest prognostic power in comparison to other sequences. Different formulas need to be used for other sequence combinations.

Native T1, native T2 and T1C in combination with other clinical or imaging measures can be used to predict outcome in various patient groups by building quantitative scores. Example application are myocarditis (data as shown above), non-ischemic and ischemic cardiomyopa-thies, risk assessment in athletes, risk assessment after COVID-19 infection, risk assessment in young adults (cardiomyopathy screening).

Figure 3:
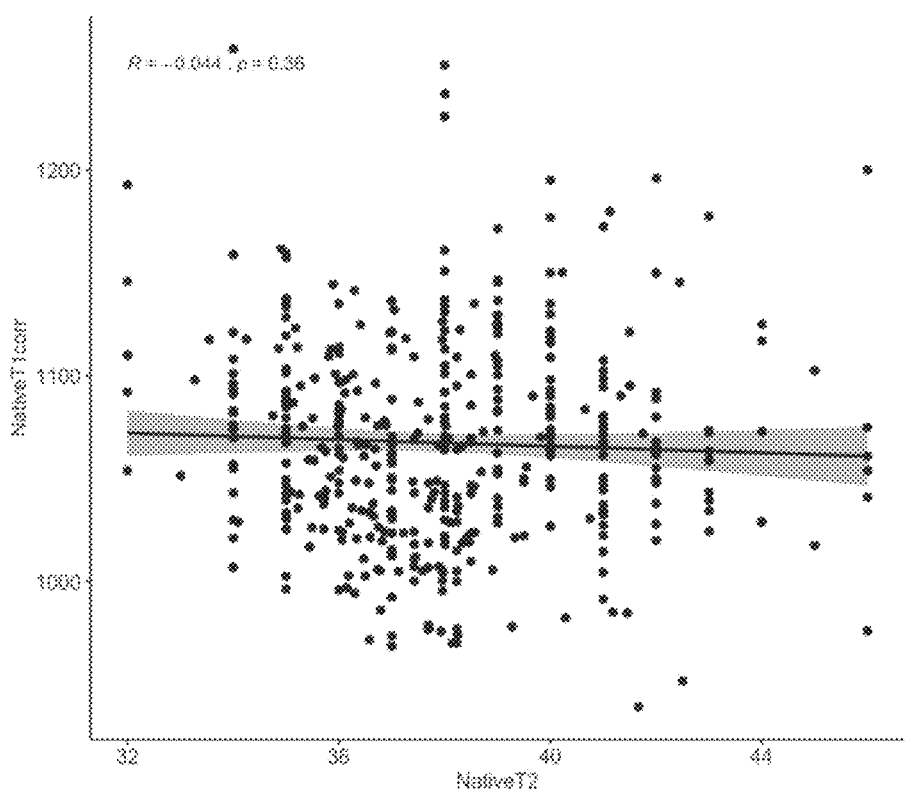
FIG. 3 shows a plot of the same patients as in FIG. 2 after correction of the native T1 values in accordance with an embodiment of the present invention and native T2 values. There is no longer an effect of T2 on T1.

As is illustrated in FIG. 3, after correction, the influence of T2 on T1C is eliminated.

To validate the corrected T1 map, T1C was then added to a model to predict outcome in patients with suspected myocarditis and was found to improve prediction in comparison to the current model.

Figure 4:
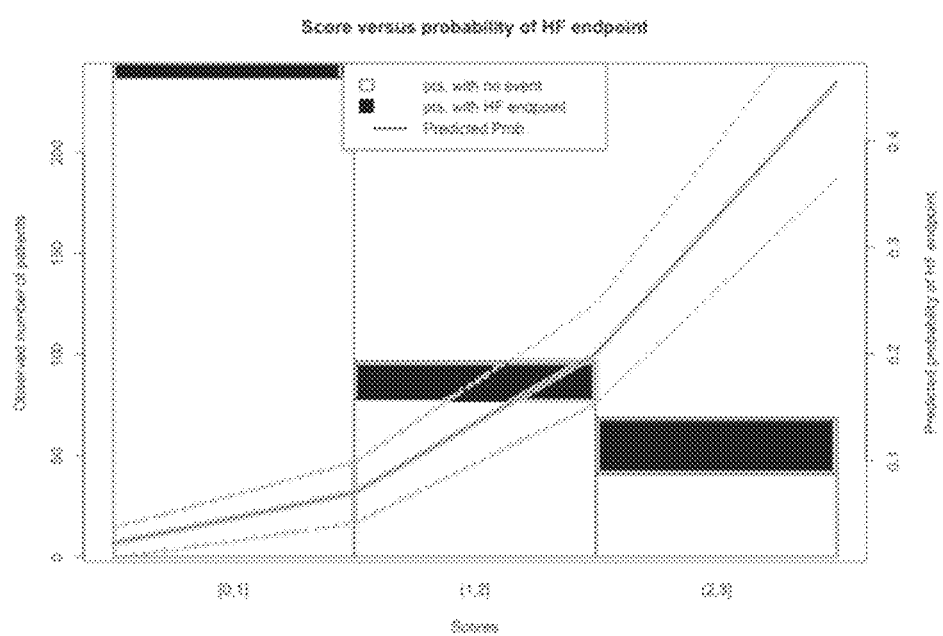
FIG. 4 shows the predicted risk for heart failure hospitalization of cardiovascular death in patients with suspected myocarditis based on the myocarditis risk score using the uncorrected T1 values. For each value of the score the number of patients is shown by the combined grey and orange boxes, the observed number of events is shown by the orange boxes, and the predicted probability of an event is shown by the black line (with confidence intervals as dark grey and dotted red lines).
Figure 5:
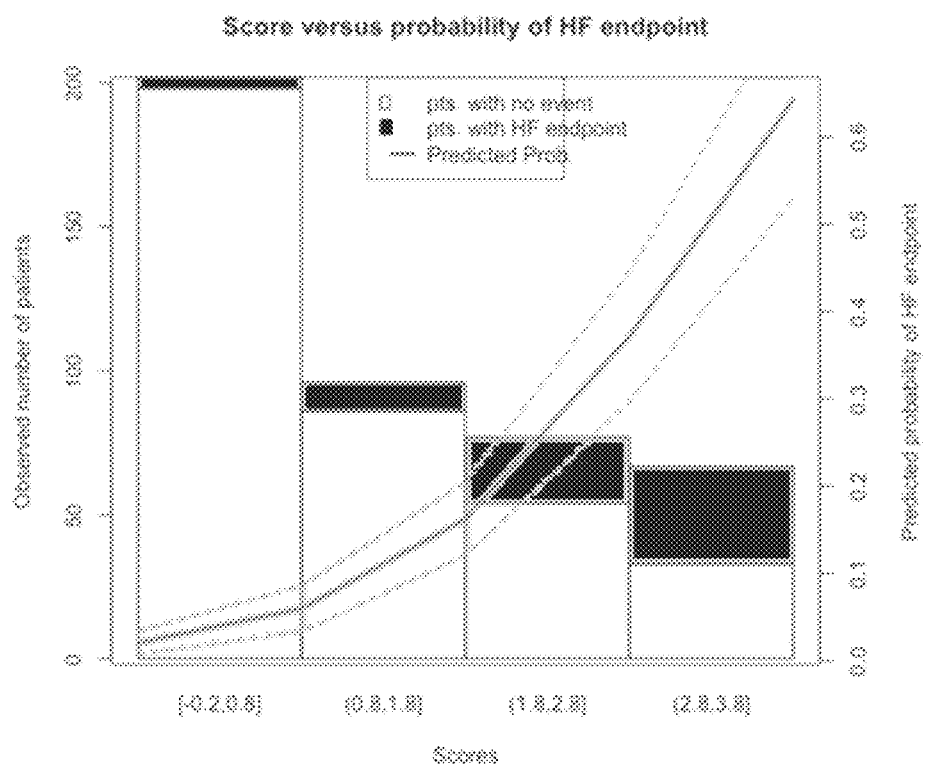
FIG. 5 shows the improved risk score as in FIG. 4 using the corrected T1 values (T1C).

In particular, FIG. 4 shows results of a novel model for risk prediction in myocarditis without T1C and FIG. 5 shows the results for an improved model. Note the higher percentage of events in the high-risk group in comparison to the model without T1C.

To further validate the accuracy of the correction we first compared native T1 before and after therapy in patients with sarcoid disease, an illness with severe myocardial inflammation. We then calculated T1C and performed a similar comparison.

Figure 6:
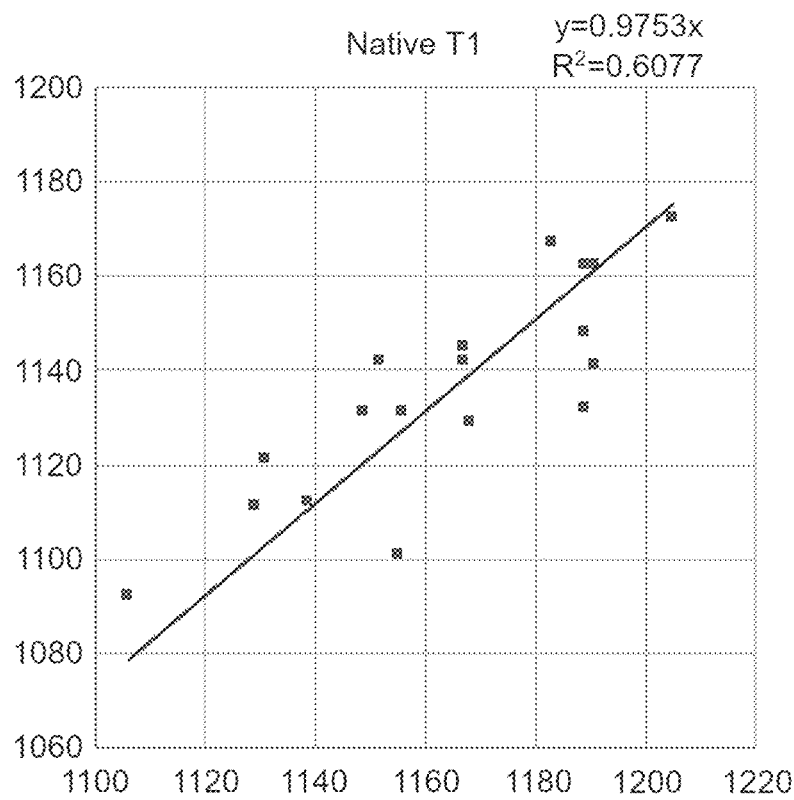
FIG. 6 shows the correlation between native T1 before and after therapy in patients with sarcoid disease, an illness with severe myocardial inflammation. There is a significant change of native T1 with therapy due to the reduction of inflammation/myocardial water.
Figure 7:
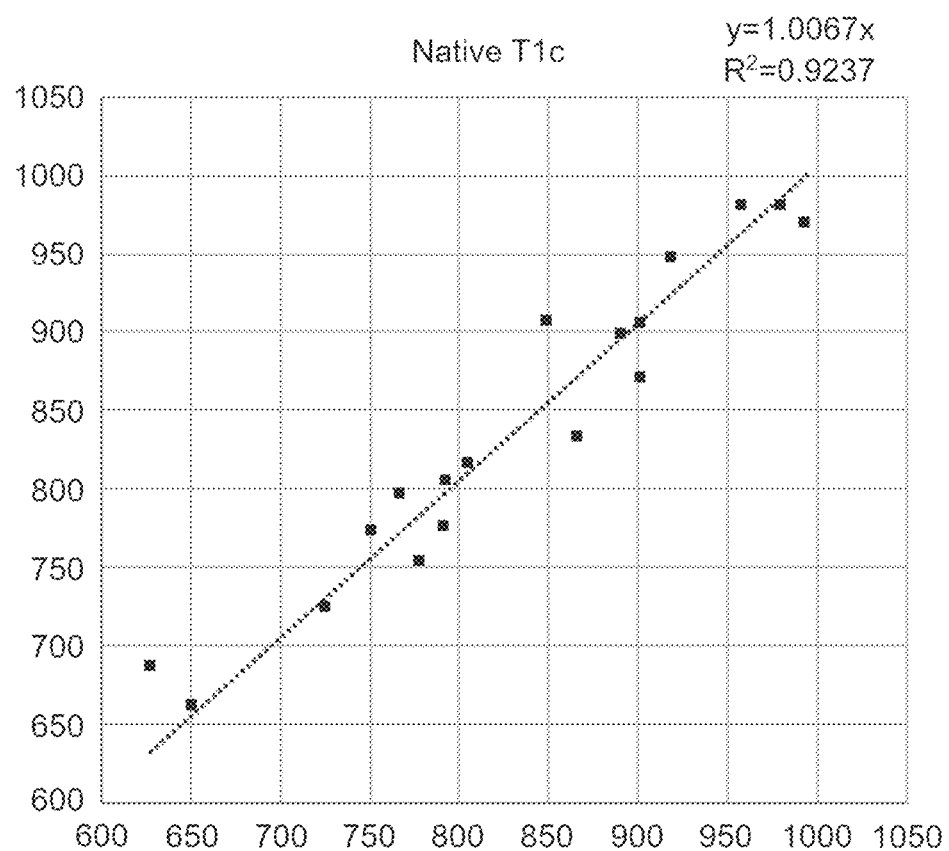
FIG. 7 shows the same patients using the corrected T1C values. There is no change of T1C due to therapy demonstrating, that the sensitivity to inflammation/myocardial water is now eliminated.

Specifically, FIG. 5 illustrates how T1 changed significantly with therapy (due to the change in T2). In contrast, FIG. 6 illustrates how T1C did not change with therapy (linear correlation with a slope of 1.00 and an R2 of 0.9237).

Experiments confirmed that T2 correction of native T1 works with all T2-sensitive MOLLI variants.

Validation has been performed specifically for a unique T1-mapping sequence developed from and used in our Institute (FFM-MOLLI 3(2)3(2)5)50° which offers the best diagnostic dis-crimination, superior reproducibility and strongest prognostic power in comparison to other sequences. Different formulas need to be used for other sequence combinations.

Native T1, native T2 and T1C in combination with other clinical or imaging measures can be used to predict outcome in various patient groups by building quantitative scores. Example application are myocarditis (data as shown above), non-ischemic and ischemic cardiomyopa-thies, risk assessment in athletes, risk assessment after COVID-19 infection, risk assessment in young adults (cardiomyopathy screening).

Further embodiments of the invention relate to a visualisation with a novel multi-dimensional colour map.

Prior art visualisation of mapping values is performed on several images displaying various colour schemes for the different data, such as T1, T2 or extracellular volume fraction (ECV) respectively. The colour schemes vary between different centres and are not scaled on absolute values or means±standard deviations or other statistically meaningful values. Consequently, the colour of the image is meaningless and can only be deciphered by an attached scale. In addition, due to the nature of all colour schemes currently used, the information is restricted to one single value, i.e. no combination of 2 data pairs is possible. To display the T1 and T2 data in a single image, a novel colour scheme was developed, which allows a standardized display. Each colour represents a combination of two values (provided as mean±standard deviation).

Systematic use of colours and integration of two measures into one scheme intuitively high-lights abnormalities (e.g. red, yellow), characterizes disease (red=fibrosis, yellow=edema), adds quantitative information (e.g. >2 or >standard deviations) and in combination allows a rapid intuitive understanding diffuse fibrosis AND regional edema).

Figure 8:
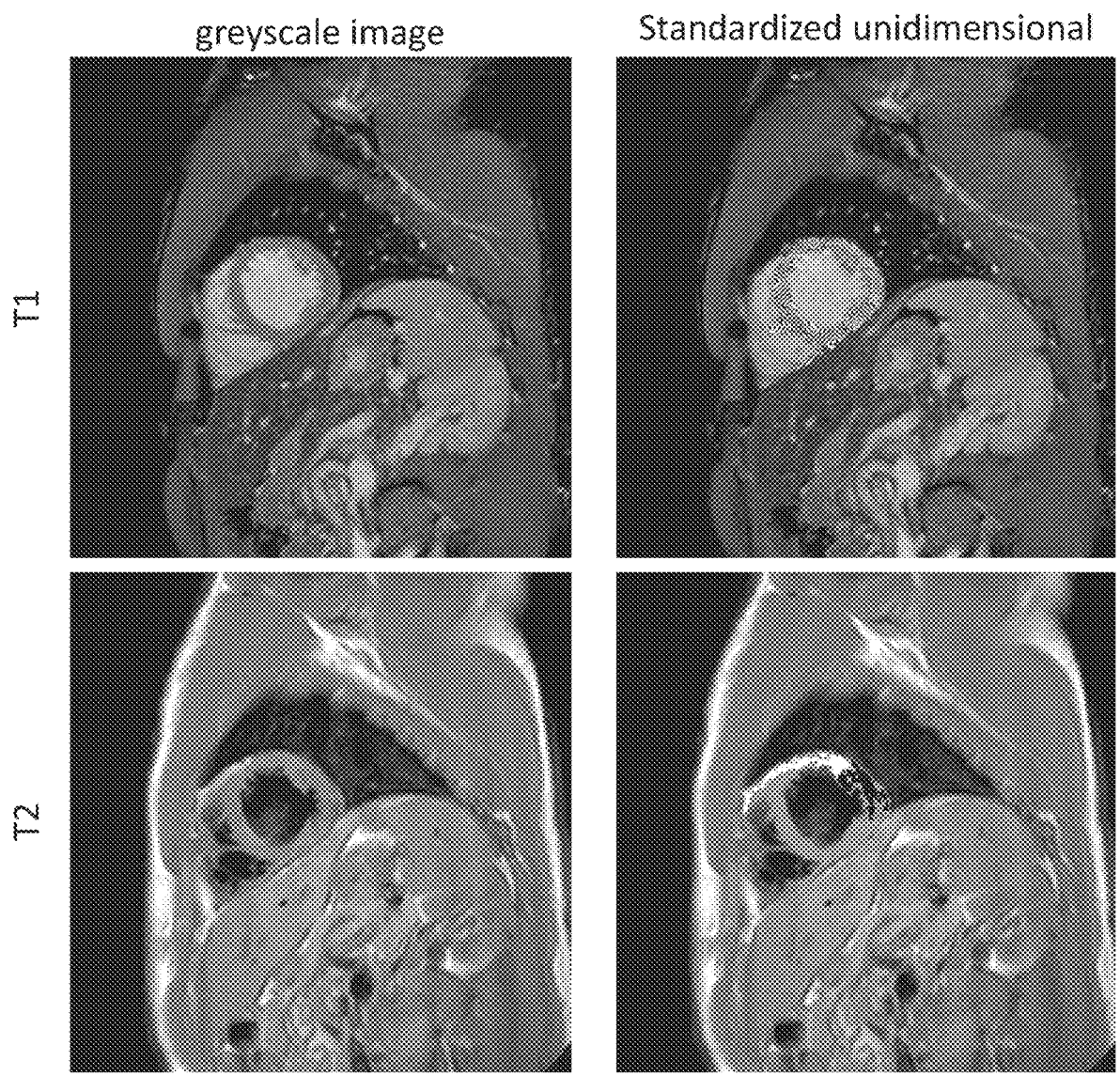
FIG. 8 shows standardized colour overlays to depict T1 representing fibrosis (upper panel) as well as T2 representing inflammation (lower panel).

FIG. 8 illustrates the novel visualization scheme. In particular, FIG. 8 shows standardized colour overlays to depict T1 representing fibrosis (upper panel) as well as T2 representing inflammation (lower panel). The use of standardized colours allows an immediate visual classification into normal, mildly abnormal and severely abnormal.

Figure 9:
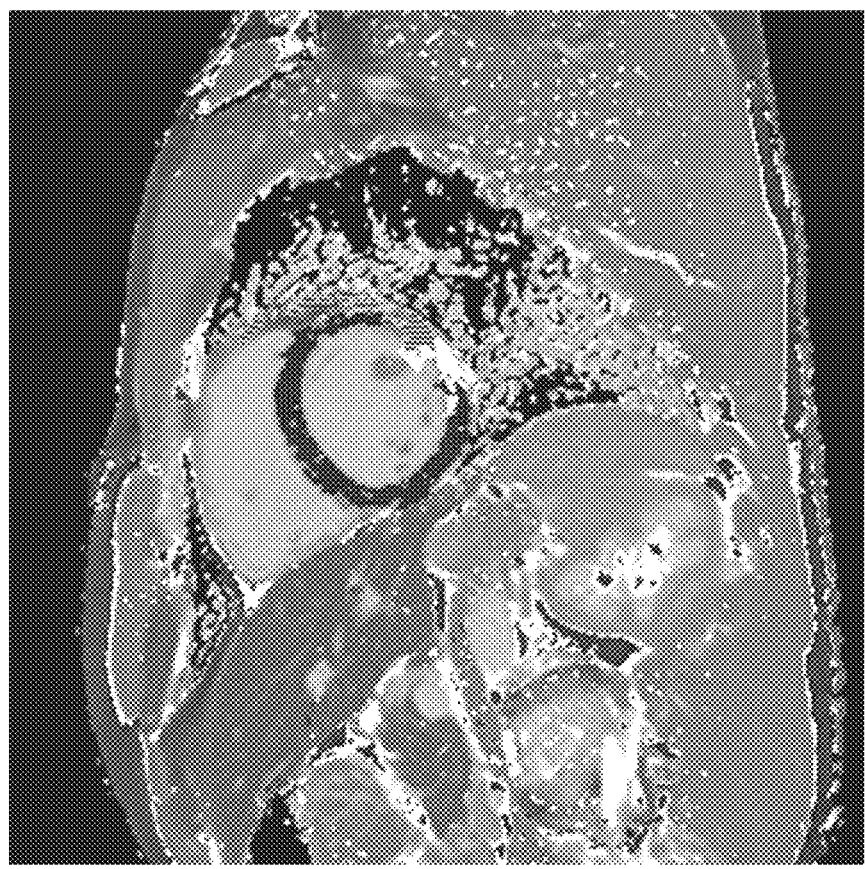
FIG. 9 shows the same patient with a combined colour overlay for fibrosis and inflammation allowing for an immediate visual classification of the underlying abnormalities.

FIG. 9 shows the same patient with a combined colour overlay for fibrosis and inflammation allowing for an immediate visual classification of the underlying abnormalities.

Figure 10:
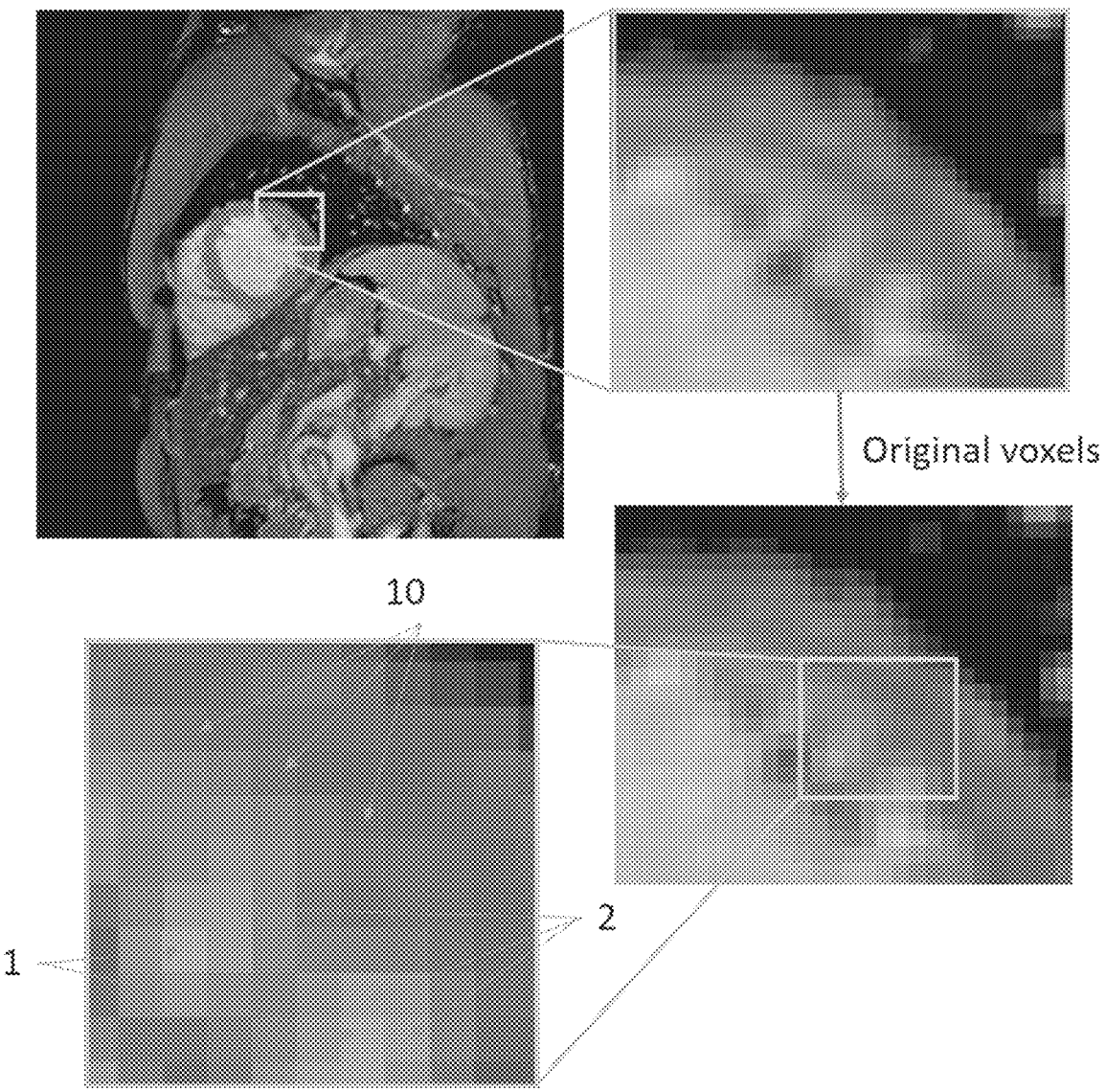
FIG. 10 shows an exemplary T1 map (upper left panel), a local magnification (orange box, right upper panel demonstrating the grey values of the original voxels.

FIG. 10 shows an exemplary T1 map (upper left panel), a local magnification (orange box, right upper panel) demonstrating the grey values of the original voxels. For demonstration purposes this is further magnified (lower left panel). To demonstrate, that each voxel contains a T1 value, some grey values with similar grey are labelled with arbitrary units. This information is usually lost, when processing images.

With different time in the cardiac cycle these voxels will move to a different position within the IMAGE (standard coordinate space) due to cardiac motion, represent a different relative amount of volume of the heart due to thickening/thinning. Consequently, to "find" the "same" voxel again on a different image deformation and of overlays/segmentations is required, no standard is available, and data is lost during documentation as the position relative to the heart is not documented.

Figure 11:
FIG. 11 shows a simplified concept of the coordinate system in the x-y axis.
Figure 11:
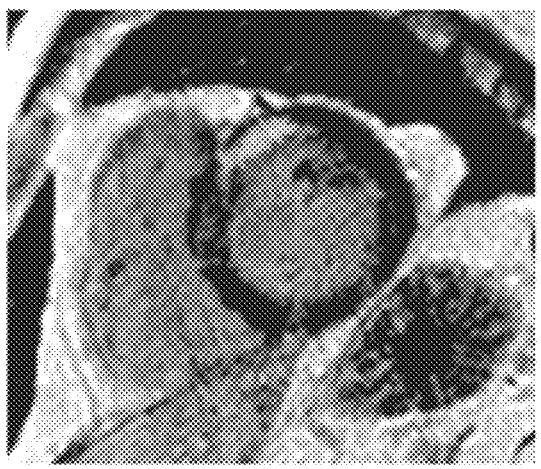
Figure 11:
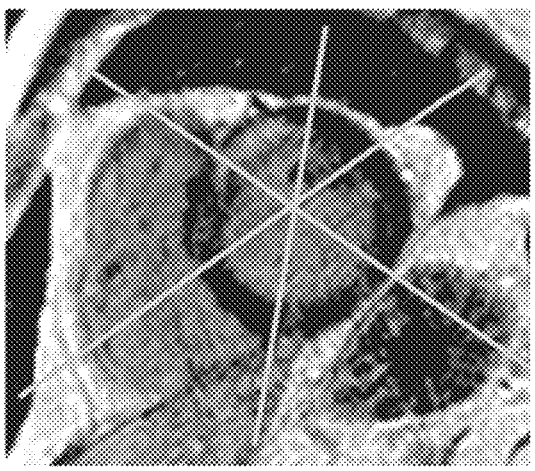
Figure 11:
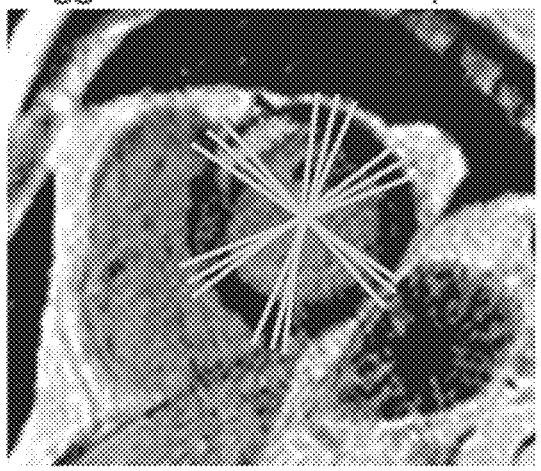
Figure 11:
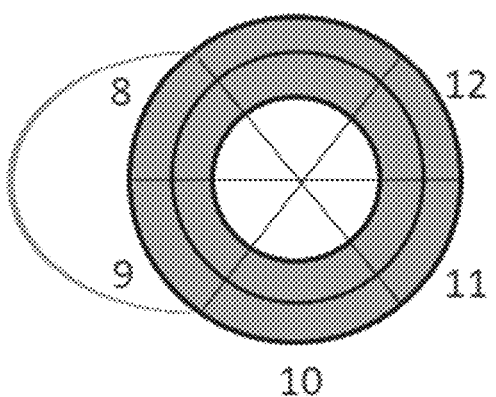

FIG. 11 shows a simplified concept of the coordinate system in the x-y axis. The images represent a typical example of a myocardial scar (white, within the black heart muscle in the left upper panel and highlighted in orange using a standardized colour overlay in the right upper panel). Using a standard segmentation system with 6 segments in this representative imaging plane, the information on the exact extent and position of the scar is lost. By expanding to 360 circumferential spokes the circumferential extent can be documented well (only a subset of spokes in shown in the right mid panel). The bottom panel shows differentiation into 2 layers from the inside to the outside of the heart as used in clinical standard. Differentiation into 100 layers (not shown) will allow better differentiation into the transmural extent of the abnormality. Additional expansion of the coordinate system will be in longitudinal direction of the heart (100 slices, see FIG. 13), and temporal position of the cardiac cycle (100 temporal positions, see FIG. 13).

The information is fully retained, can be stored without human intervention into a database and can be compared between different patients or time points.

Figure 12:
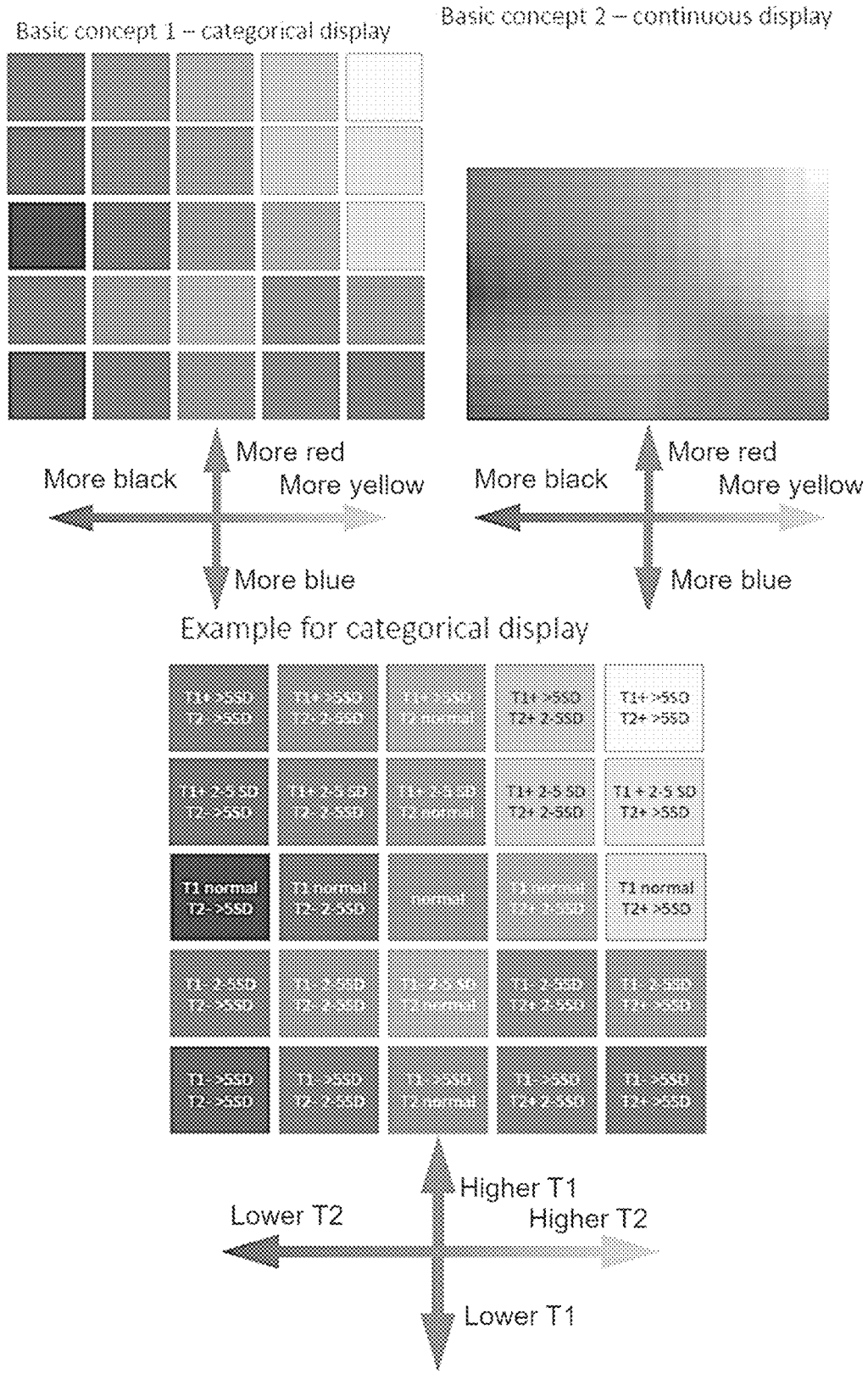
FIG. 12 shows the concept for a standardized colour scheme.

FIG. 12 illustrates the concept for a standardized colour scheme to allow for rapid intuitive presentation of abnormalities of two combined imaging markers. Whereas one imaging marker (e.g. T1) is depicted in increasing red for higher values and increasing blue for lower values with grey being the normal range, the second imaging marker (e.g. T2) is depicted in increasing yellow for higher values and increasing black for lower values with grey being the normal range. Each combination of values (e.g. T1 and T2) can be assigned a standardized colour for the severity of abnormality (e.g. >2 or >5 standard deviations above or below normal). Thus, the resulting colours are no longer random but represent a well-defined abnormality. The scheme can be made continuous if original numbers rather than classification into abnormalities and standard deviations is required (upper right panel).

In the traditional 17-segment model, all information about the exact transmural position in the heart muscle (layers) is lost. For the circumferential position in the heart muscle there are 6 instead of 350 positions, so that the exact position and extent cannot be described and it is unclear when a segment is positive. For the longitudinal description there are 3 levels (instead of 100) with the same consequence. This means that with the traditional model it is only possible to save: Segment X is not affected, partially affected, strongly affected, completely affected. This is no longer sufficient for modern machine learning algorithms.

Figure 13:
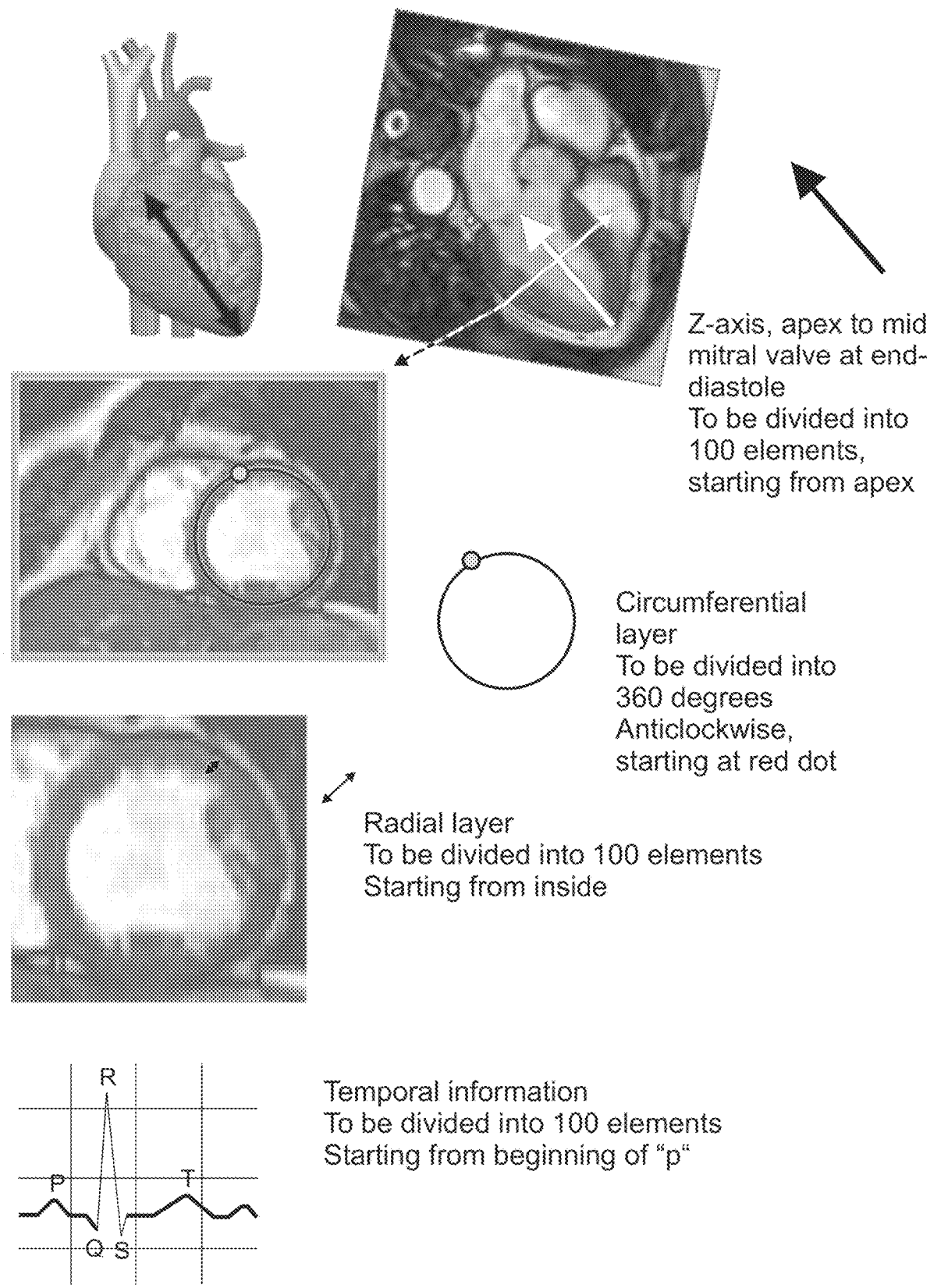
FIG. 13 shows the basis for the concept of the coordinate system in the z-axis and in the transmural direction.

FIG. 13 shows the basis for the concept of the coordinate system in the z-axis and in the transmural direction. The z-axis (longitudinal axis as defined by a line from the apex to the mid of the mitral valve) is divided in 100 elements, starting from the apex. Thus every longitudinal position of the heart is exactly defined. The circumferential position is then delineated as 360 equiangular spokes starting from the insertion point of the right ventricle (red dot). The spokes are demonstrated in FIG. 11. The transmural position is described as 100 layers from the inside to the outside of the heart muscle (orange arrow). The temporal position is provided a 100th of a cardiac cycle, starting from the beginning of the p-wave. In other embodiments the peak of the R-wave can be used as reference starting point.

Improved Model for Risk Prediction in Myocarditis—Myocarditis Risk Score

A further embodiment provides a risk assessment tool for prognosis in patients with suspected myocarditis. Risk assessment in patients with suspected myocarditis (myocarditis) can be based on symptoms, blood markers and magnetic resonance imaging. Using outcome data in patients with suspected myocarditis (myocarditis) we can build a prognostic model. This model contains a lot of data (blood parameters, imaging, symptoms, etc.), but works almost as well with a few decisive parameters. Based on these parameters (blood tests, magnetic resonance imaging) can reduce the risk of heart failure or death are predicted. This is the first score for assessing the risk of patients with clinical suspected heart muscle inflammation. Previous recommendations are not based on prognostic data and require an invasive biopsy.

So far, there is no score in clinical application. The guidelines recommend Biopsy for diagnosis. There are recommendations for diagnosis with MRI, these are but is not based on outcome data and does not allow risk assessment.

Myocarditis is an inflammatory disease of the heart muscle, associated with adverse cardiovascular outcomes, including non-ischaemic dilated cardiomyopathy (DCM), heart failure (HF) and sudden cardiac death (SCD). The contemporary approach to clinical recognition requires a two-step process by establishing the pre-test likelihood of myocarditis, followed by formal confirmation using invasive endomyocardial biopsy (EMB). In practice, the invasive step is frequently omitted for several reasons. It depends on the availability of EMB-expertise and experienced pathologists reference centres. As most patients show only mild symptoms and no or minor structural abnormalities, the necessity of the invasive step is often questioned and deliberated. Clinical trials of EMB-guided therapy were neutral for therapeutic benefit. The societal guidelines diverge on the use of EMB; while the European Society of Cardiology (ESC) considers EMB the means of definitive diagnosis in all patients with high pre-test likelihood of myocarditis, the American College of Cardiology (ACC) foresees its use in selected patients with unclear aetiology of HF and rapid clinical deterioration.

Thus-far prognostic markers in myocarditis include positive EMB-based immunohistochemical criteria (IHC), the NYHA functional class, beta-blocker therapy, male sex, presence of late gadolinium enhancement (LGE) using cardiovascular magnetic resonance (CMR). However, none of these measures support clinical decision-making. Anti-remodelling therapy is initiated based on HF symptoms and reduced left ventricular ejection fraction (LVEF). The prognostic relationships of emerging quantitative non-invasive tissue markers by T1 and T2 mapping have not been systematically assessed. The aim of this study was to examine these candidate variables as predictors of outcome and to develop and validate a model for individualized risk prediction in patients with myocarditis.

Methods

The prognostic model was derived from a prospective longitudinal multicentre cohort study (NCT03749343, NCT02407197). First, the predictive associations of candidate variables were examined to generate the required number of relevant predictors for entry into the prognostic model. The prespecified criterion was a 15% significance level of univariable prognostic association with an endpoint. Next, the prognostic model was developed using Cox proportional hazard model, to provide individualized risk estimates for the probability of adverse events during an average of 2 years. The model was validated internally with ten-fold cross-validation and externally by training the model on 2 centres and validating it against the third centre. Finally, a clinical risk score to predict the likelihood of an event at 2 years was developed based on this model was developed. All procedures were carried out in accordance with the Declara-tion of Helsinki (2013). The study protocol was reviewed and approved by institutional ethics committees and written informed consent was obtained from all participants.

Study Population and Participating Centres

The study cohort consists of consecutively evaluated patients recruited prospectively from 3 European University hospitals between October 2011 to December 2019 (University Hospital Frankfurt, Kerckhoff Clinic Bad Nauheim, both Germany; Guy's and St Thomas's Hospital, London, United Kingdom). Some of the patients entered into the present dataset have been included in a previous publication. Only adult patients (≥18 years of age) with no prior major adverse cardiovascular events (MACE) or previous HF hospitalisation were studied. Inclusion criteria were the predefined criteria for clinically suspected myocarditis in line with the current ESC position statement, including: ≥1 clinical presentation and ≥1 diagnostic criterion (OR in asymptomatic patients ≥2 diagnostic criteria from different categories). Exclusion criteria in brief included pre-existing cardiac conditions, heart transplantation, contraindications to contrast enhanced CMR, including pregnancy or unable to provide informed consent. This status was determined independently of the research team.

Patient Assessment and Data Collection

Clinical demographics, medication, blood tests, EMB results, CMR measurements and follow-up data were recorded at baseline and at regular clinical follow-ups using REDCap electronic data capture tools. Blood tests were included if obtained within 7-days from the clinical diagnosis.

EMBs were routinely employed in the diagnostic pathway by several attending physicians (Frankfurt and Bad Nauheim, Germany). Procedural details are included in supplementary material. EMB analyses were performed by accredited EMB-reference centers of the operator's choice (details in supplementary material). The predefined EMB-based variables included Dal-las Criteria (DC), immunohistochemical criteria (IHC) and presence of viral genome.

CMR was performed on 3-Tesla clinical scanners (Frankfurt, Bad Nauheim: Skyra, Siemens Healthineers, Erlangen, Germany; London: Philips Achieva, Eindhoven, The Netherlands), using standardised protocols and unified sequence parameters at the participating imaging sites. Details of imaging parameters are included in the Supplementary material. Myocardial T1 and T2 mapping were acquired in a single midventricular short-axis slice using a validated variant of a modified Look-Locker Imaging sequence (GoetheCVI®-MOLLI), whereas for T2 mapping, validated sequences for measurement of myocardial oedema, T2-FLASH or T2-GraSE, were used on Siemens or Philips scanners, respectively. Postcontrast T1 mapping was not routinely performed. Analytical validation data for mapping sequences have been summarized elsewhere. LGE imaging was performed ~10 min after administration of 0.1 mmol/kg body weight of gadobutrol (Gadovist®, Bayer AG, Leverkusen, Germany). Interpretation and post-processing of the mapping data were performed following standardized operating procedures by the core-lab staff on pseudonymised datasets, blind to the underlying clinical information. CMR-based variables are included in Table 1S.

Clinical Outcomes

Follow-up of patients was performed either during routine clinical assessments or telephoni-cally every 12 months. The cause of death was determined by review of patient records, death certificates, autopsy reports, or interviews with witnesses; adjudication of events was performed by experienced cardiologists independently of the research team. The primary outcome endpoint was MACE, consisting of cardiovascular mortality, sudden cardiac death (SCD), an appropriate internal cardioverter defibrillator (ICD) discharge. The secondary endpoint consisted of a composite of death due to HF or HF hospitalisation (HF endpoint). The first single event per patient from the date of inclusion was included in the analysis. Event definitions are provided in the Supplementary material.

Variable Selection

Candidate variables tested are listed in Table 1S (supplementary material) and included cardiac risk factors, blood markers (haematocrit, high sensitive (hs)C-reactive protein (hs-CRP) and hs-troponin (hs-TropT), estimated glomerular filtration rate), EMB (IHC, DC, viral presence) and CMR parameters (LVEF, RVEF, LV mass index, native T1 and T2). Univariable Cox regression analyses were conducted for each candidate variable to test the assumptions of linearity with the outcome in the exploratory dataset. The proportional hazards assumption required by the Cox model was investigated using Schoenfeld residuals. The prespecified criterion for entry into prognostic model was a 15% significance level of univariable prognostic association with an endpoint.

Model and Risk Score Development

The final risk model was developed using the entire dataset (multivariable Cox regression, stepwise, backward Wald). Multivariable Cox regression models were fitted with predictors. Non-normally distributed variables were log-transformed prior to the entry into regression model. The model was developed without centre as a predictor to allow the model to be used in other cohorts of myocarditis. The clinical risk score based on the model allows estimation of individual probability of an adverse event at 2 years. ten-fold cross-validation as well as externally by training it on two centres and validating it against the third centre also allowing deter-mination of healthcare system effects; the reported performance indices include calibration slope, intercept, and C-index. Sensitivity analyses for centre/healthcare system effect represent the external validation and were conducted as described above.

Sample Size

To ensure that the regression coefficients of the model were estimated with adequate precision, a minimum of 10 equivalent events were required per variable in the final model. The 64 MACE and 129 HF equivalent endpoint events observed in the entire cohort allowed the estimation of up to 6 and 12 regression coefficients and perform sensitivity analyses.

Comparison with the Standard of Practice

HF guidelines-directed anti-remodelling therapy in patients with reduced LVEF was employed as a comparator standard of contemporary practice. A time-resolved clinical risk score based on LVEF≤45% for MACE and HF events was created, respectively.

Statistical Analysis

Statistical analysis was carried out using SPSS software (SPSS Inc., Chicago, IL, USA, version 25.0) and RStudio Version 1.2.5001 (RStudio Inc., packages 'rms', 'survival', 'sur-vminer','caret', 'nricens', 'mice'). Variables are expressed as mean+standard deviation (SD), median (interquartile range, IQR) or counts (percentages) as appropriate. Time to-event analysis was performed using univariable and multivariable Cox proportional hazards models from the date of consent to the date of reaching the study endpoint or to the date of their most recent evaluation. Kaplan-Meier graphs were used to present time-to-event relationship for categorical values. Missing data were handled using standard imputation methods (predictive mean matching) and checked for any incurred biases. Patients with >25% of missing predictors were excluded from the final model. All tests were two-tailed and p-value of <0.05 was considered statistically significant.

Results

Baseline Characteristics

The final study cohort consisted of 722 patients fulfilling the criteria of clinically suspected myocarditis. Patients were similar for clinical presentation, cardiovascular risk factors and medication. Patients with events had significantly higher hsCRP, hs-TropT, native T1 and T2, and mildly reduced LVEF. The presence of LGE was more common in patients with events (38% vs. 64%, p<0.01). Hs-TropT was significantly over the upper reference limit (URL) in 144 (20%), of which 87 also had evidence of LGE.

Endpoint Events During Follow-Up

During a follow up period of median 19 (15-23) months, 64 (9%) patients had a MACE; these consisted of 46 HF deaths, 2 acute coronary syndromes, 13 appropriate ICD discharges, 2 SCDs, 1 stroke. The HF endpoint consisted of 30 HF deaths and 99 HF hospitalisations. A total of 12 (26%) MACE and 29 (23%) HF events took place within 6 months from the baseline. During the observation period, 116 (16%) patients were treated with an ICD, whereas 2 received a dual-chamber pacemaker.

Missing Data

Hundred and sixteen patients (16%) had at least one predictor missing. No patient needed ex-cluding from analysis due to missing data. Missing data were most common for NYHA class (n=109, 15%) and blood tests (hs-CRP n=79, 10%; hs-TropT n=84,12%).

Model Development

Exploratory analyses were conducted in consecutive patients with EMB routinely employed in the diagnostic pathway (the results are detailed in the supplementary material). Six predictors fulfilled the prespecified criteria for entry into prognostic model with MACE, including hs-CRP, hs-TropT, native T1 and T2, LGE and LVEF. For the HF endpoint, additional predictors also included haematocrit, age, male gender and RVEF. Cardiovascular risk factors, medication, EMB-based parameters and other measures of cardiac structure did not meet the entry criteria.

The estimates of the hazard ratios (HR, 95% confidence interval, CI) for the above predictors for MACE in the entire dataset are shown in Table 1. The predictors satisfied the assumption of proportional hazards. The final multivariable Cox regression model (backward, Wald) included native T2, hs-TropT, LGE for MACE (Chi-square: 89.8, p<0.001) and the HF endpoint (Chi-square: 157.3, p<0.001). The risk of an event at 2 years for an individual patient can be calculated from the following equation: Probability event at 2 years=1-0.998exp (PI), PI for MACE=0.673*LGE+0.245*nativeT2 (ms)+0.906*hs-TropT (lg10);

PI for HF endpoint=0.427*LGE+0.251*nativeT2 (ms)+ 0.823*hs-TropT (lg10).

Model Validation

Figure 14A:
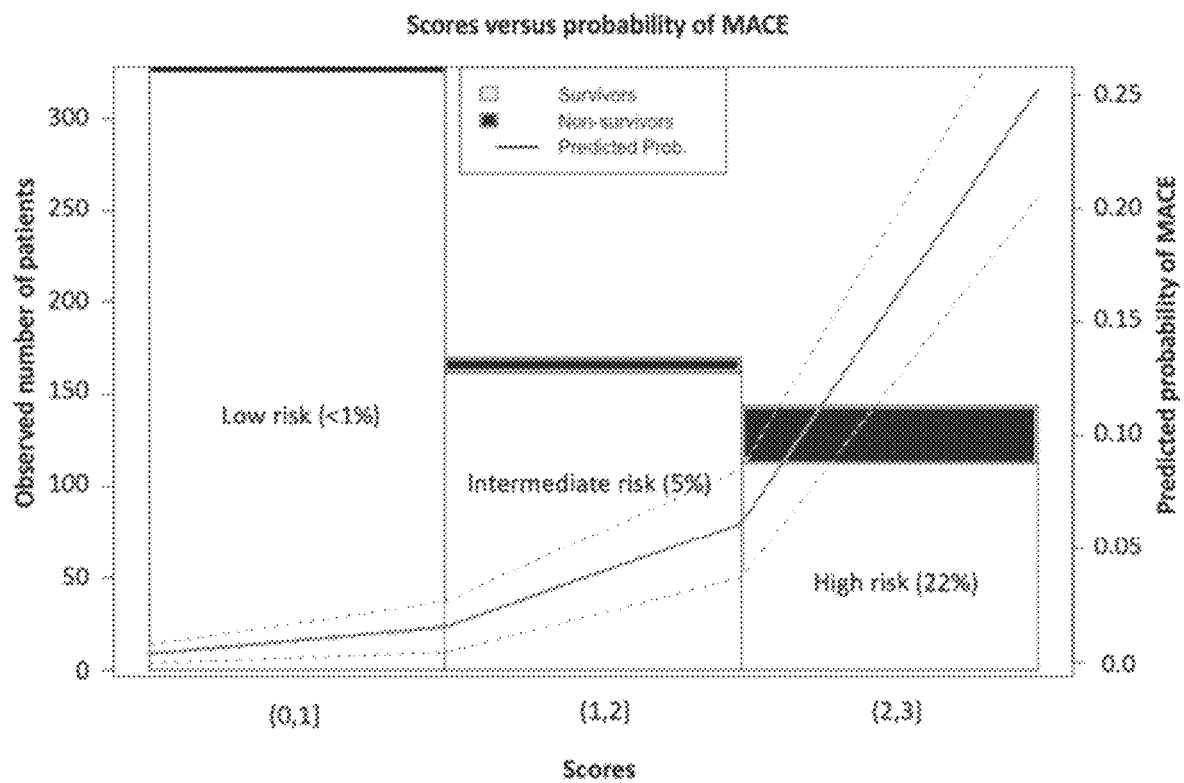
FIG. 14A shows the Myocarditis sore for the probability of death or adequate shock in patients with suspected myocarditis.
Figure 14B:
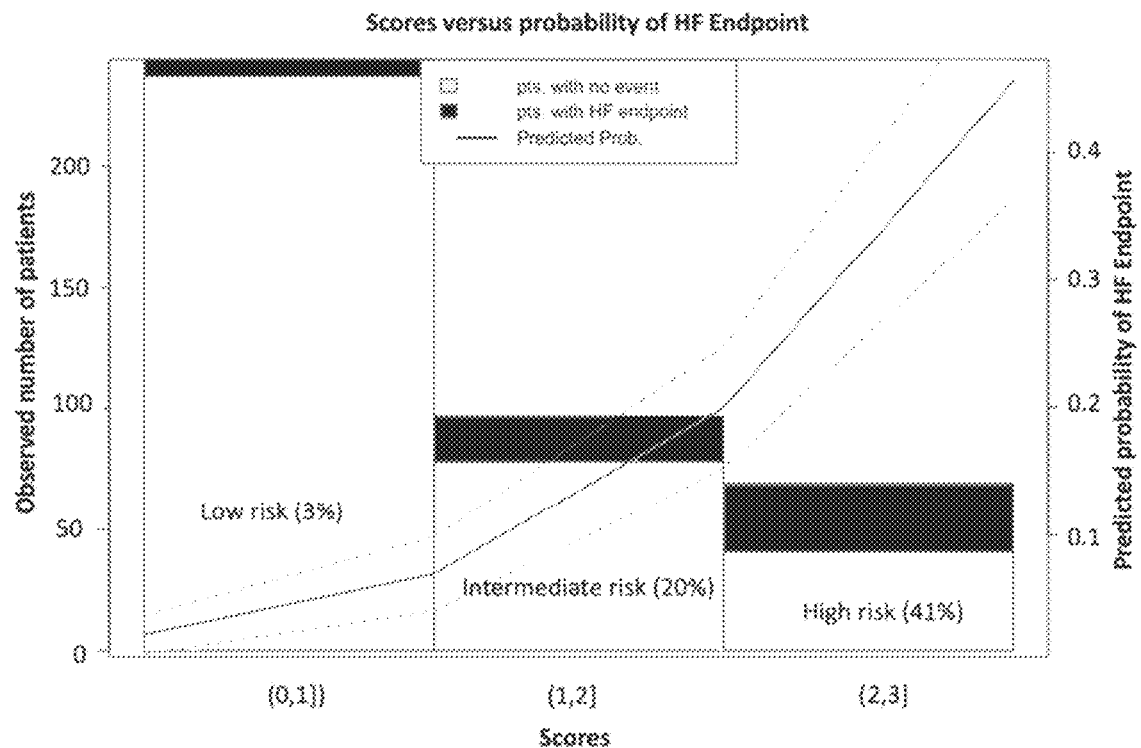
FIG. 14B shows the Myocarditis sore for the probability of heart failure hospitalization of heart failure death in patients with suspected myocarditis.

FIG. 14A shows the Myocarditis sore for the probability of death or adequate shock in patients with suspected myocarditis and FIG. 14B shows the Myocarditis sore for the probability of heart failure hospitalization of heart failure death in patients with suspected myocarditis. In particular, FIGS. 14A and 14B illustrate a good agreement between the observed and predicted risk of MACE or HF endpoint at 2 years. Cross-validation of the prognostic model revealed for MACE a calibration slope of 1.07 (95% CI: 0.78, 1.36), an intercept −0.52 and C-index 0.82 (95% CI: 0.65, 0.99). Respective indices for the HF endpoint included: a calibration slope of 1.04 (95% CI: 0.74, 1.16), an intercept 0.01. C-index was 0.79 (95% CI: 0.59, 0.86).

Sensitivity Analyses for Centre/Healthcare Effect—External Validation

The estimates of HRs from the model adjusting for centre effects were similar to the developed model without centre. The effect of individual centres on the model by training the data of two centres with validation again the remaining centre showed good agreement for both endpoints, see below table.

| | Univariable Cox regression analysis | | | | |
|---|---|---|---|---|---|
| | MACE (n = 64) | | HF Endpoint (n = 129) | | |
| Variable | HR (95% CI) | Sig. (p-value) | HR (95% CI) | Sig. (p-value) | |
| Age (years, 10 yrs) | 1.2(1.0-1.4) | 0.02 | 1.2(1.0-1.3) | 0.01 | |
| Male sex, n(%) | 0.80(0.48-1.4) | 0.40 | 1.4(0.96-1.9) | 0.09 | |
| Haematocrit (%) | 0.95(0.90-0.99) | 0.05 | 0.96(0.89-1.00) | 0.08 | |
| hs-CRP (mg/l, lg10) | 2.7(1.6-4.6) | <0.001 | 2.0(1.3-2.1) | 0.002 | |
| hsTropT (pg/l, lg10) | 4.6(3.0-6.9) | <0.001 | 4.1(3.0-5.5) | <0.001 | |
| LV-EF, % | 0.98(0.96-0.99) | 0.02 | 0.99(0.97-1.00) | 0.049 | |
| RV-EF, % | 0.97(0.95-0.98) | 0.01 | 0.98(0.97-0.99) | 0.01 | |
| Native T1 (ms/10 ms) | 1.13(1.10-1.17) | <0.001 | 1.11(1.09-1.14) | <0.001 | |
| Native T2 (ms) | 1.4(1.3-1.5) | <0.001 | 1.4(1.2-1.5) | <0.001 | |
| Myocardial LGE, n(%) | 3.2(1.9-5.3) | <0.001 | 2.3(1.6-3.3) | <0.001 | |
| | Multivariable Cox Regression (Backward Wald) | | | | |
| | MACE (n = 64) | | | HF Endpoint (n = 129) | |
| Vs. London | 0.77 | 1.3 | 0.79 | 0.82 | 0.99 | 0 |
| Vs. Frankfurt | 0.62 | 0.80 | −0.49 | 0.78 | 1.01 | 0 |
| Vs. Bad Nauheim | 0.70 | 0.94 | −0.79 | 0.83 | 1 | 0 |

-continued

| Univariable Cox regression analysis | | | | | |
|---|---|---|---|---|---|
| Chi-square (p-value) | 89.8(<0.001) | | 157.3(<0.001) | | |
| Variables in the model | HR (95% CI) | Sig. (p-value) | | HR (95% CI) | Sig. (p-value) |
| Native T2 (ms) | 1.3(1.2-1.4) | <0.001 | Native T2 (ms) | 1.3(1.2-1.4) | <0.001 |
| hs-TropT (lg10) | 2.5(1.5-4.1) | 0.001 | hs-TropT (lg10) | 2.3(1.6-3.3) | <0.001 |
| LGE (present) | 2.1(1.2-3.8) | 0.01 | LGE (present) | 1.5(1.1-2.2) | 0.02 |
| Variables excluded (p-value): | Native T1 (0.17), LVEF (0.44), hs-CRP(g10) (0.32). | | Age (0.40), Sex (male, 0.31), hs-CRP(g10) (0.98). Ht (0.18), Native T1 (0.50,) LVEF (0.65), RVEF (0.34). | | |

| Sensitivity analysis: model with centre MACE (n = 64) | | | HF Endpoint (n = 129) | | |
|---|---|---|---|---|---|
| Chi-square (p-value) | 101.5 | <0.001 | 169.7 | <0.001 | |
| Variables in the model | HR (95% CI) | Sig. (p-value) | HR (95% CI) | Sig. (p-value) | |
| Native T2 (ms) | 1.3(1.2-1.4) | <0.001 | Native T2 (ms) | 1.3(1.2-1.4) | <0.001 |
| hs-TropT (lg10) | 2.3(1.4-3.9) | 0.002 | hs-TropT (lg10) | 2.2(1.5-3.2) | <0.001 |
| LGE (present) | 2.1(1.3-3.6) | 0.005 | LGE (present) | 1.5(1.1-2.3) | 0.01 |
| Centre | 0.99(0.98-1.01) | 0.43 | Centre | 0.99(0.98-1.1) | 0.30 |
| Trained in 2, validated in the remaining centre | C-index | Calibration Slope | Intercept C-index | Calibration Slope | Intercept |

Myocarditis Risk Score

Figure 15A:
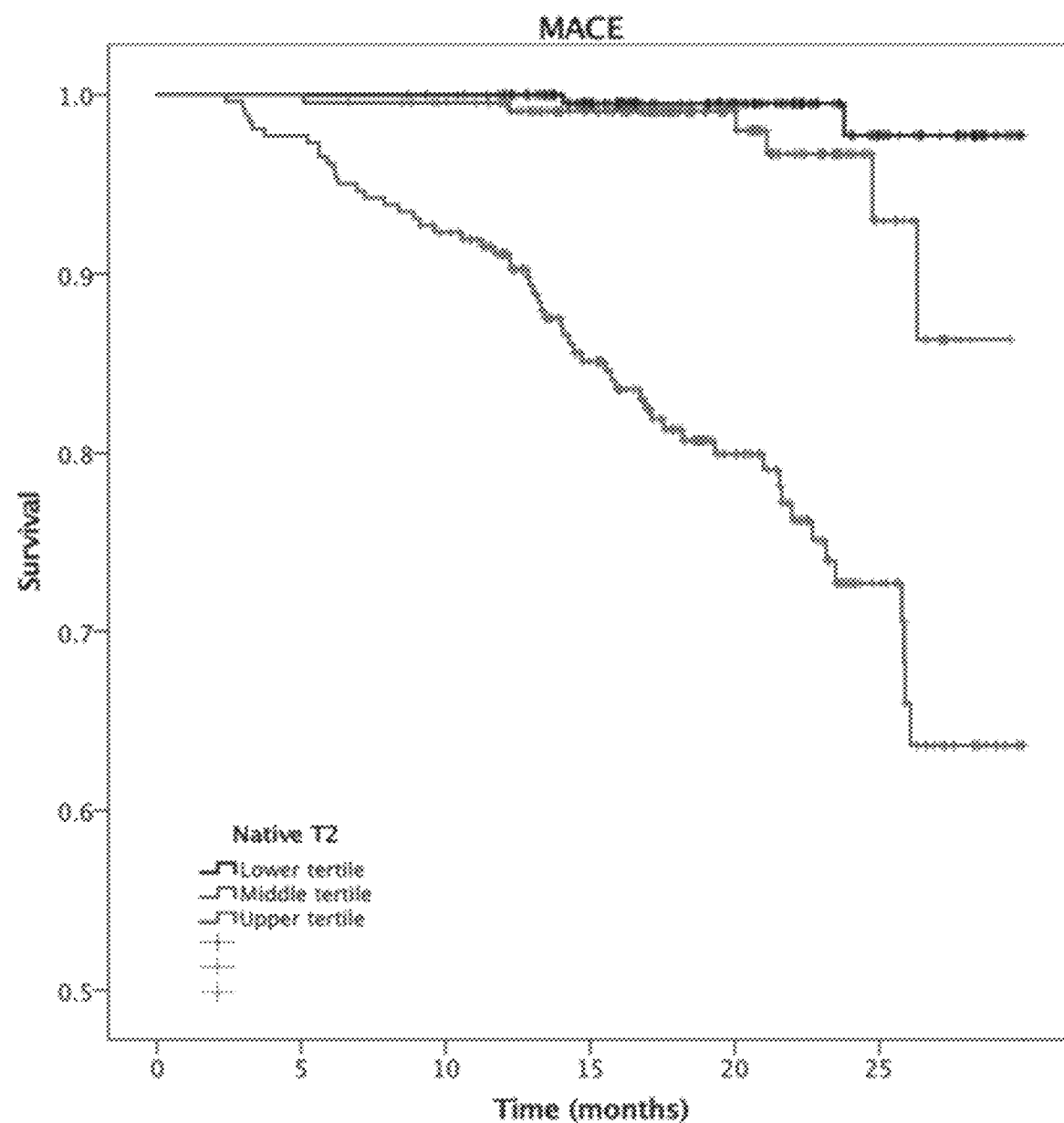
FIGS. 15A, 15B and 15C show Kaplan-Meier curves for native T2 and hs-TropT (tertiles) and LGE (binary) for MACE.
Figure 15B:
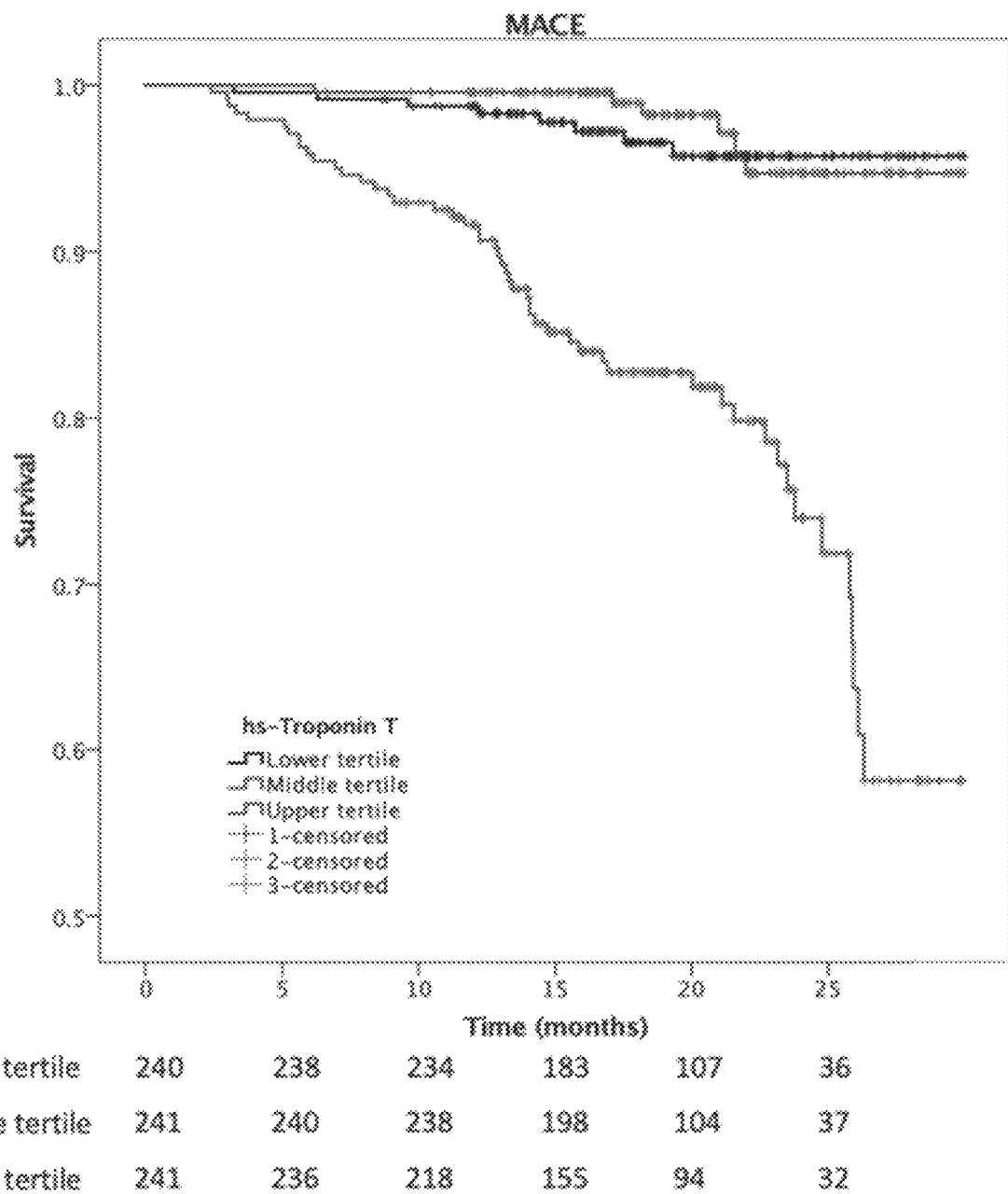
Figure 15C:
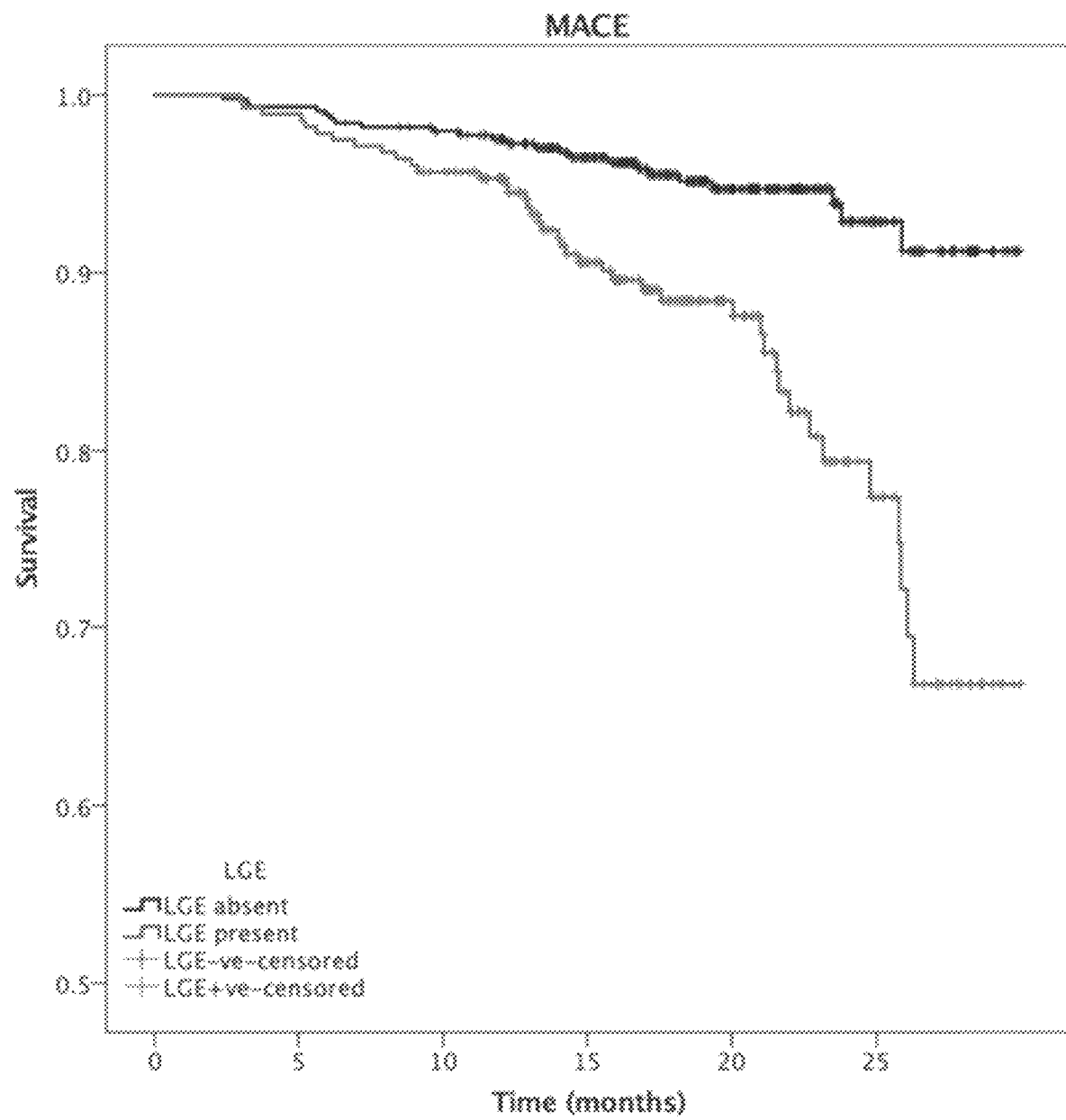

We calculated the 2-year risk for each endpoint using predictor-based scores from the model-based predicted probabilities (MACE: native T2 (ms): score of 1.5 if >38 and score of 2.0≥40; hs-TropT (lg10 pg/l); score of 1 if ≥0.84; LGE score of 0.5 if present; HF endpoint: native T2 (ms): score of 1.0 if >38 and score of 2.0>40; hs-TropT (lg10 pg/1); score of 1 if ≥0.84; LGE score of 0.5 if present). Three risk groups per endpoint (low, intermediate and high risk) were created with an average % chance of an event per group: MACE: 0-<1 (<1%), 1-<2 (5%), ≥2 (22%); HF endpoint: 0-<1 (3%), 1-2 (20%), ≥2 (41%) (see FIGS. 14A and 14B). Stratifying patients into three risk groups by the Myocarditis RISK score revealed that a majority (56, 87%) of all MACE and HF endpoint (102, 79%) occurred in patients classified as high-risk group by the score. FIGS. 15A, 15B and 15C show Kaplan-Meier curves for native T2 and hs-TropT (tertiles) and LGE (binary) for MACE.

Comparison with Standard of Practice

The model based on the standard of practice for initiation of the antiremodelling therapy in HF patients (LVEF≤45%), resulted in a C-index of 0.59 (0.52-0.66) for MACE and 0.56 (0.51-0.61) for the HF endpoint. Stratifying patients based on LVEF (>46 vs. ≤45%) revealed near equal proportions of MACE 32 (8%) vs. 32 (11%) in both groups (p=0.14), and HF events 67 (52%) vs 63 (49%) (0.27). The calculation of net reclassification based on the Myocarditis Risk score was performed in patients with LVEF>46% (n=442); 141 patients overlapped with the high-risk group by the score of which a total of 29 had a MACE. This identifies an important subgroup which is currently untreated that might benefit from treatment to potentially reduce the event rate.

Discussion

This is the first study to provide a prognostic model for individualised risk prediction in patients with clinical diagnosis of myocarditis. Our findings demonstrate that myocardial oedema, injury and scar, using T2 mapping, hs-TropT and non-ischaemic LGE, respectively, provide the most accurate estimates of outcome in patients with a high pre-test likelihood of myocardial inflammation. The prognostic model was derived from a large and diverse population of patients with clinically suspected myocarditis from several European centres and healthcare systems. Our findings reveal the comparatively weaker predictive power of histological parameters, challenging the current concept of EMB as the central diagnostic requirement in myocarditis. The Myocarditis RISK score, based on prognostic model derived in this article, provides an easy to use clinical tool based on the readily available clinical parameters. Comparisons with contemporary management practice reveals a potential to identify additional patients for therapy that are currently untreated. Further studies are required to test whether the Myocarditis RISK score can improve outcome by either repurposing the available treatment or novel approaches.

Our results are based on a large prospective longitudinal tertiary hospital dataset from 2 European countries. Whereas in German centres, clinicians often routinely employed an EMB-based diagnostic pathways, omitting the invasive step was the mainstay approach of clinical management elsewhere. This is in part explained by the sicker myocarditis population encoun-tered in the German tertiary centres, contrasting the practice in United Kingdom, where university hospitals serve as the first point of presentation to specialised medical care. Neverthe-less, the prognostic model was shown to be independent of the centre or healthcare system, reiterating the robust performance and validity of the broad clinical inclusion criteria. In this article, we avoided preselecting patients based on any previous diagnostic criteria, including the Lake-Louise Criteria, and conducted exploratory analyses to independently determine predictors to be considered for a prognostic model. T2 mapping was identified as the strongest and independent predictor in the exploratory dataset, a finding subsequently replicated in the entire cohort as well as in the training and validation datasets based on the recruiting centre. The exploratory analyses inform that the prognostic model cannot be refined by addition of EMB information, despite the considerable evolution of the histological diagnostic criteria over time. Expanding the diagnostic criteria to also include the immunohistological readouts, aimed to accord with the heterogenous clinical presentation, following the realisation that the DC on their own were frequently negative in patients with convincing clinical symptoms. Current ESC guidelines specify IHC definitions in terms of required cell-count and type of the inflammatory infiltrate. However, the guidelines also permit methodological openness by 'unspecified immunohistochemical criteria', conceding the search for a better measure. High costs, the neces-sary procedural expertise and an overall paucity of expert cardiac pathologist reference labor-atories, pose further practical limitations, which remain formally unexamined. In contrast, magnetic resonance imaging technology is widely available (with an average of 25 and 38 units per million inhabitants in Germany and the U.S, respectively). Although most units are de-ployed to non-cardiac scanning, this is rapidly changing owing to standardised, shorter imaging protocols, which can be completed under 30 min.

The Myocarditis RISK score relies on a small number of selected myocardial measures, two of which—hsTropT and LGE—are already well established in standard clinical assessment of suspected myocarditis. For the first time, T2 mapping is firmly placed into the domain of clinical utility. The overall robustness, availability and simplicity of the three measures mean that the score can be used routinely, permitting a uniform approach to diagnosis and risk assessment in myocarditis. Non-ischaemic myocarditis-like LGE was strongly predictive of both outcome endpoints, reiterating the observations of numerous previous studies in myocarditis. The presence of LGE is a result of an infarct-like myocarditis due to regional myocardial necrosis, and may be associated with considerable troponin leak in the acute stage. As significant troponin release and LGE only marginally co-localised, troponin cannot solely be explained by an ongoing regional necrosis, but it rather relates to a diffuse myocardial process, which is unde-tectable by LGE. Thus, LGE has prognostically a separate role from the diffuse destructive processes, whose significance in myocarditis is evidenced by a much stronger prognostic association for hs-TropT and T2 mapping with both outcome endpoints.

Mapping techniques measure magnetic properties of myocardium, which are altered in the presence of diffuse disease, thus providing objective measures of severity, disease evolution or response to treatment in absolute terms. Myocardial T2 mapping is a specific measure of myocardial oedema. Extensive reports on raised native T2 in disease models of inflammatory car-diomyopathies, have been complemented with histological validation of inflammation and myocardial injury. The strong prognostic association of T2 mapping in the present study supports the notion that the active inflammatory process is central to the myocardial injury in myocarditis, promoting cardiac dysfunction and poor outcome. Our findings resonate with the emerging evidence for the overall role of chronic inflammation in outcomes of cardiovascular disease.

Contrary to the notion that myocarditis mostly heals without sequelae, our findings confirm the considerable morbidity and poor prognosis. T2 mapping and troponin had higher prognostic significance compared to diffuse fibrosis and remodelling by native T1 or LVEF, respectively. This finding is relevant as markers of remodelling and dysfunction are the cornerstones of cardiovascular assessment and clinical management, also in myocarditis. Whereas the Myocarditis RISK score allocates the majority of patients with events into the high-risk group (>80%), LVEF identifies only 50% of these, communicating a potential for reclassification of those at the highest risk, especially with preserved LVEF that remain untreated. In those with receipt of therapy, the Myocarditis RISK score may guide personalised intensification of treatment. Targeting myocardial inflammation earlier may also provide benefit by reducing the scar burden and mitigate HF development, currently limited by an unresolved means of early and accurate recognition. Taken together, the Myocarditis RISK score may provide an opportunity for an important step-change from the current standard of clinical management.

An early sign of HFpEF is diastolic dysfunction measured by echocardiography as E/e'. Exper-imental results of the inventors show that a score developed from a combination of CMR parameters with a blood marker (BNP) correlates much stronger with invasively determined diastolic function than echocardiography.

Colour Scheme

We propose the "Goethe Colour Scheme", a colour scheme for standardised representation of 1- and 2-dimensional biomarkers. Currently, there are many different colour schemes for displaying medical data. These are firstly used randomly and secondly do not allow the representation of 2 dimensions.

The proposed colour model allows 1) a standardized categorical representation with intuitive reading of the values from the colour and 2) a combined representation of 2 markers simultaneously through a 2-dimensional colour model.

1.) By creating a two-dimensional colour space (instead of the usual circle) both the center ("normal"/"normal") and an increase/decrease of one or two parameters can be clearly represented.
2.) This colour space can be represented continuously as well as unambiguously defined (e.g. normal=less than 2 standard deviations below or above the mean value; increase/decrease=2-5 standard deviations above/below the mean value, strongly increase/decrease=>5 standard deviations above/below the mean value. This enables an instrument for the uniform presentation of two biomarkers with a single colour. Thus, the colour coding of a pixel can represent two pieces of information simultaneously, e.g. (fibrosis and inflammation) or (function and blood circulation).

Up to now there are many one-dimensional colour schemes with linear continuous scale. These can be arbitrarily divided into specific areas. In the medical field, echocardiography comes closest to the proposed concept: the speeds, directions or potential turbulence of the blood are displayed in different colours. Red, for example, is the colour of the blood flowing towards the transducer, while the blood flowing away from the transducer is shown in blue. Varying nu-ances of these colours represent the speed of the blood flow: the lighter the colour, the higher the speed. In addition, green components are mixed in when turbulence occurs.

Now the following advantages are achieved:
1.) Possibility to make an immediate assessment based on a colour
2.) Standardized comparison of different patients or follow-ups can be presented intuitively.
3.) Instead of integration of two data from different data sets in the brain of the observer to a large extent with the task of exact spatial allocation, each spatial data point can be assigned clear information about the two parameters.
4.) Schemata used as standard in colour theory are not sufficiently intuitive for medical applications (e.g. pathological, normal are not separated sufficiently, the middle is defined as 'white', this is usually 'a lot' in medicine).

Coordinate System for Cardiac Data

The proposed model allows a standardized machine-readable documentation of measurements of the heart with high resolution. Thus, different parameters from different imaging techniques can be documented in a precisely defined matrix. This allows a comparison with normal values, other patients and follow-ups. Up to now, a 17-segment model has been widely used in the clinic. At higher resolution, this model is divided into 34 sub-segments with the outer and inner layers of the heart. Within this model, voxels are often used, but they do not have a clear position in the heart and therefore cannot be documented in a machine-readable way. For biomedical modelling there are specific models with finite elements and higher resolution, but these can only be used by experts and do not allow for a generally transferable unambiguous position.

Model: Instead of the currently usual 17 segments of the left ventricle, the left ventricle is divided into a four-dimensional coordinate system (in the direction of the longitudinal axis (longitudinal), circumferentially around the longitudinal axis, perpendicular to the heart muscle (radial), along the time axis. This uses 100 longitudinal positions, 360 circumferential positions, 100 radial positions and 1000 temporal positions. A further subdivision or averaging of the positions with poorer resolution is possible without any problems. As an easier to handle version for imaging, a division into: longitudinal positions, 36 circumferential positions, radial positions and 100 temporal positions is used.

The coordinate system can be used in two versions:
1) linear, i.e. all motion components are assumed to be linear (i.e. a longitudinal shortening is assumed to be a similar shortening of all heart planes)
2.) real, i.e. existing knowledge/model of the movement components is integrated in the description Advantages of the model are machine readability, the unambiguous description of each position in the left ventricle by three coordinates, the first possibility to combine different imaging techniques and multi-parametric information (with different spatial resolutions) unambiguously and thus a massive number of possibilities.

Figure 16:
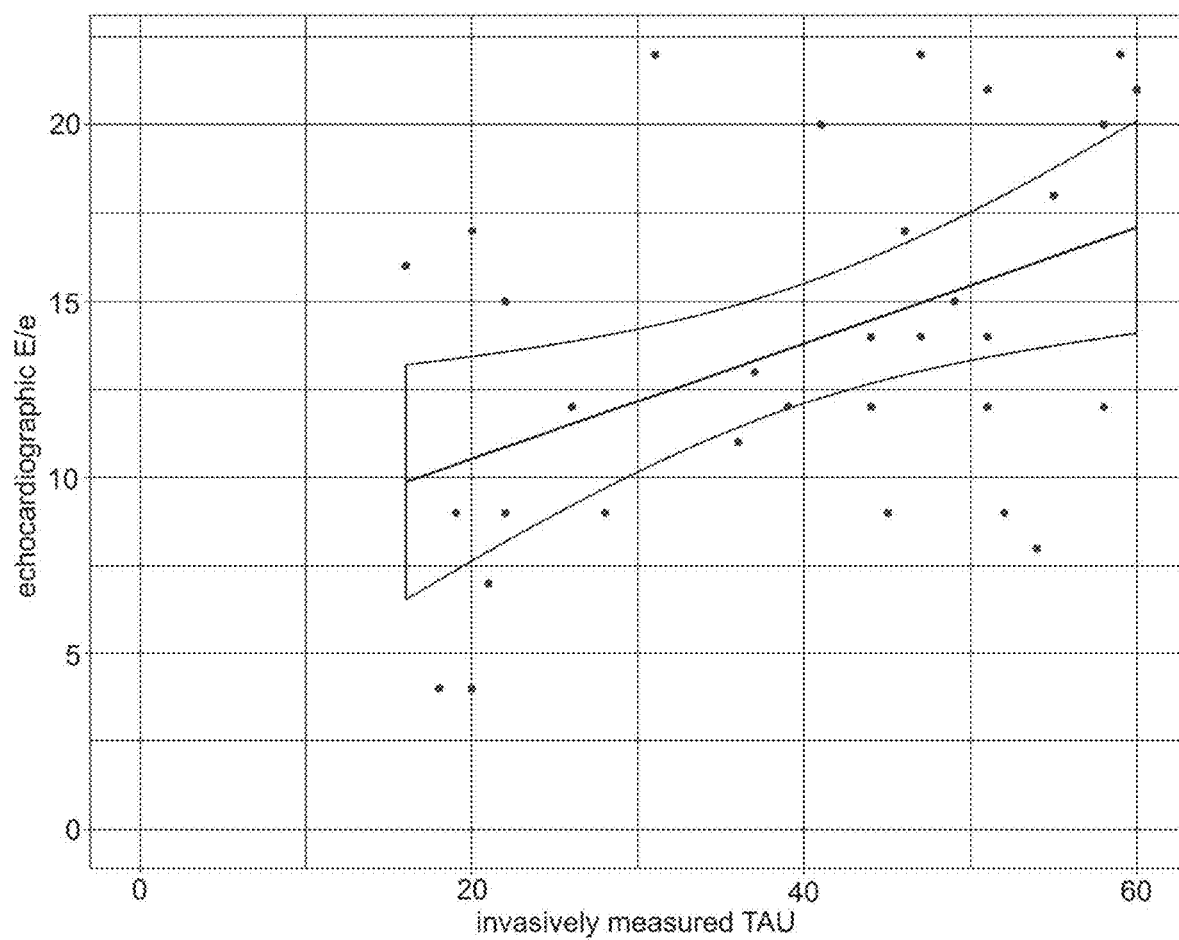
FIG. 16 shows the correlation between the most frequent echocardiographic measure (E/e') with invasively measured left ventricular stiffness (TAU).

FIG. 16 shows the correlation between the most frequent echocardiographic measure (E/e') with invasively measured left ventricular stiffness (TAU) which is regarded as the reference standard. The correlation r=0.45.

Figure 17:
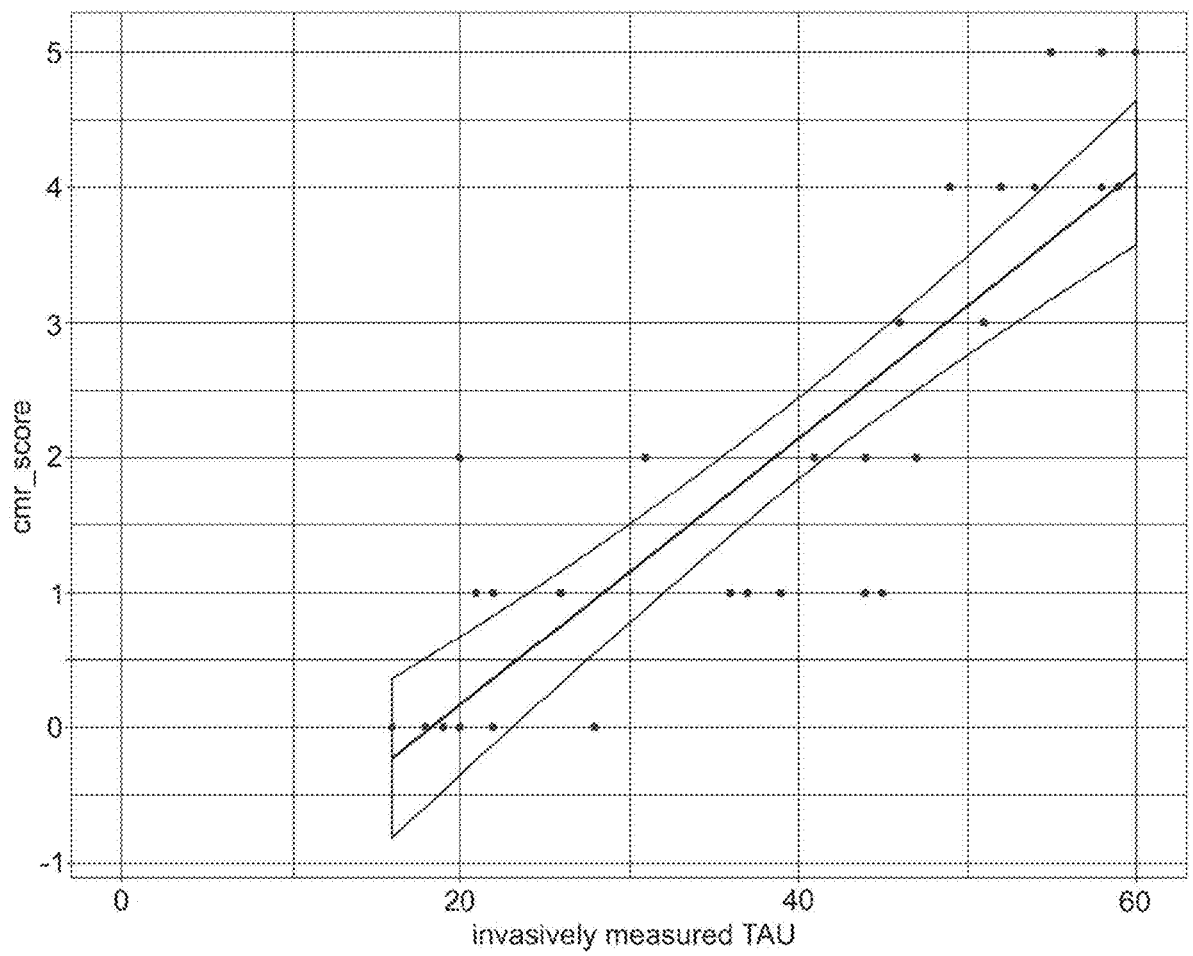
FIG. 17 shows the correlation between the novel CMR score with invasively measured left ventricular stiffness (TAU).

FIG. 17 shows the correlation between the novel CMR score with invasively measured left ventricular stiffness (TAU) as the reference standard. The correlation is r=0.86.

Figure 18:
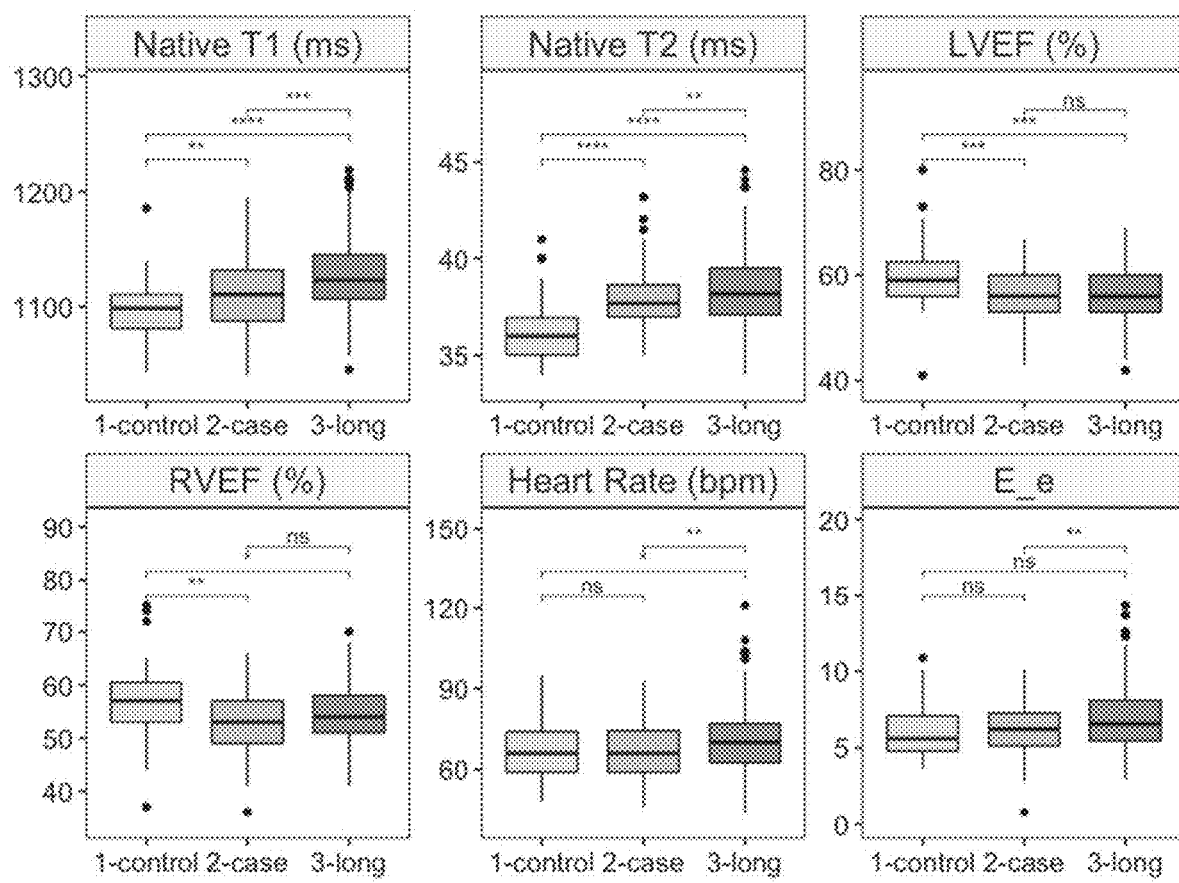
FIG. 18 shows boxplots between age-gender-risk factor-matched controls, patients after COVID with no symptoms and patients with 'long COVID'.

FIG. 18 shows boxplots between age-gender-risk factor-matched controls (1-control), patients after COVID with no symptoms (2-case) and patients with 'long COVID' (3-long). ns=no significance, *=p<0.05, =p<0.01, *=p<0.001, ****=p<0.0001. Note the strong p-values for native T1, and native T2 versus echocardiographic E/e' (E_e).

Presented methods allow to diagnose early diastolic abnormalities in otherwise healthy people who have a reduction of fitness, e.g. after COVID-19 infection. Our data clearly demonstrates cardiac changes in patients after COVID-19. These changes are most pronounced in those patients who have new or ongoing symptoms after more than 4 weeks after infection also referred to as 'long COVID'. Again, while echocardiography picks up changes in the group with symptoms versus those without, it does not detect the differences between controls and COVID patients (see also FIG. 18).

The foregoing descriptions are only implementation manners of the present invention, the scope of the present invention is not limited to this. Any variations or replacements can be easily made through person skilled in the art. Therefore, the protection scope of the present invention should be subject to the protection scope of the attached claims.

The invention claimed is:

1. A method for non-invasive quantitative imaging of a heart, the method comprising:
obtaining, by at least one processor, an initial T1 map and a T2 map of the heart; and
correcting, by the at least one processor, the initial T1 map using the T2 map in order to obtain a corrected T1 map; wherein the correcting the initial T1 map comprises subtracting from a value in the initial T1 map a weighted value of the T2 map and adding a constant.

2. The method of claim 1, wherein a weight of the weighted value is between 10 and 15, preferably between 11 and 14, in particular between 12 and 13, and wherein the constant is between 350 and 500, preferably between 400 and 450.

3. The method of claim 1, further comprising:
using a 2D colour map to map a value from the corrected T1 map and a value from a corresponding position in the T2 map to an output colour, wherein in the 2D colour map, a lowest value in a first direction corresponds to a first colour, a highest value in the first direction corresponds to a second colour, a lowest value in a second direction corresponds to a third colour, and a highest value in the second direction corresponds to a fourth colour, wherein the first to fourth colour are different colours, and
outputting the output colour on a screen.

4. The method of claim 1, further comprising:
obtaining a radiologic image comprising a magnetic resonance image of the heart;
determining, based on the radiologic image, a longitudinal axis of the heart;
for at least one selected location in the image, determining at least one cardiologic coordinate, wherein the at least one cardiologic coordinate comprises:
a longitudinal coordinate, which indicates a projection of at least one selected location onto the longitudinal axis,
a circumferential coordinate, which indicates a circumferential position of the at least one selected location around the longitudinal axis, and
a radial coordinate, which indicates a radial distance of the at least one selected location from the longitudinal axis; and
using the at least one cardiologic coordinate to annotate the at least one selected location, wherein the annotating the at least one selected location comprises:
outputting the at least one cardiologic coordinate on a screen,
storing the at least one cardiologic coordinate in a data storage, and/or
visualizing on a screen one or more lines, overlaid over the radiologic image, wherein the one or more lines correspond to a constant longitudinal coordinate, a constant circumferential coordinate, and/or a constant radial coordinate of the at least one cardiologic coordinate.

5. The method of claim 1, further comprising:
using a 2D colour map to map a value from the T1 map and a value from a corresponding position in the T2 map to an output colour, wherein in the 2D colour map, a lowest value in a first direction corresponds to a first colour, a highest value in the first direction corresponds to a second colour, a lowest value in a second direction corresponds to a third colour, and a highest value in the second direction corresponds to a fourth colour, wherein the first to fourth colour are different colours, and outputting the output colour on a screen, wherein preferably the T1 map is a corrected T1 map that has been corrected based on the T2 map.

6. A device for non-invasive quantitative imaging of a heart, wherein the device is configured to carry out the method of claim 1.

7. A computer-readable storage medium storing program code, the program code comprising instructions that, when executed by a processor, carry out the method of claim 1.

8. The method of claim 1, wherein the initial T1 map and the T2 map comprise a region of the heart, and the method further comprises predicting a risk of a cardiac event for a patient with myocarditis, wherein the predicting comprises:
obtaining a T1 value based on the region of the heart in the corrected T1 map and obtaining a T2 value based on the region of the heart of the patient in the T2 map, wherein the region is a single mid-ventricular short-axis slice, and computing the risk based on a weighted sum of the T1 value, the T2 value and one or more additional coefficients.

9. A method for annotating medical data of a heart, the method comprising:
obtaining, by at least one processor, a radiologic image, comprising a magnetic resonance image, of the heart;
determining, based on the radiologic image, a longitudinal axis of the heart; and for at least one selected location in the image, determining, by the at least one processor, at least one cardiologic coordinate, wherein the at least one cardiologic coordinate comprises:
a longitudinal coordinate, which indicates a projection of the at least one selected location onto the longitudinal axis,
a circumferential coordinate, which indicates a circumferential position of the at least one selected location around the longitudinal axis, and a radial coordinate, which indicates a radial distance of the at least one selected location from the longitudinal axis; and
using the at least one cardiologic coordinate to annotate the at least one selected location.

10. The method of claim 9, wherein the annotating the at least one selected location comprises:
outputting the at least one cardiologic coordinate on a screen,
storing the at least one cardiologic coordinate in a data storage, and/or
visualizing on a screen one or more lines, overlaid over the radiologic image, wherein the one or more lines correspond to a constant longitudinal coordinate, a constant circumferential coordinate, and/or a constant radial coordinate of the at least one cardiologic coordinate,
and further comprising
rounding the longitudinal coordinate into one of a predetermined number of possible longitudinal positions, wherein preferably the predetermined number of possible longitudinal positions is between 50 and 200, preferably 100,
rounding the circumferential coordinate into one of a predetermined number of possible circumferential positions, wherein preferably the number of possible circumferential positions is 360, and/or
rounding the radial coordinate into one of a predetermined number of possible radial positions, wherein preferably the number of possible radial positions is between 50 and 200, preferably 100.

11. The method of claim 9, further comprising rounding the longitudinal coordinate, wherein preferably the rounding is initially used for a visualization, comprising an overlay of the radiologic image and an indication of the boundaries of the rounding.

12. The method of claim 9, wherein the cardiologic coordinate further comprises a temporal coordinate, wherein the temporal coordinate is determined based on a temporal distance to a predefined point of a cardiac cycle, wherein preferably the predefined point is defined relative to a P spike of the heart, preferably a beginning of the P spike.

* * * * *